(12) United States Patent
Roderick et al.

(10) Patent No.: US 8,100,341 B1
(45) Date of Patent: Jan. 24, 2012

(54) SOLAR POWER AUGMENTED HEAT SHIELD SYSTEMS

(75) Inventors: David Roderick, Hopland, CA (US);
Myron Beigler, Woodside, CA (US)

(73) Assignee: David Roderick, Hopland, CA (US)

( * ) Notice: Subject to any disclaimer, the term of this patent is extended or adjusted under 35 U.S.C. 154(b) by 41 days.

(21) Appl. No.: 12/835,979

(22) Filed: Jul. 14, 2010

Related U.S. Application Data

(60) Provisional application No. 61/226,722, filed on Jul. 19, 2009.

(51) Int. Cl.
*F24F 7/06* (2006.01)

(52) U.S. Cl. ........ 236/49.3; 454/186; 454/365; 454/366; 52/173.3; 52/198

(58) Field of Classification Search ................. 236/49.3; 454/185, 186, 365, 366, 367; 52/173.3, 198
See application file for complete search history.

(56) References Cited

U.S. PATENT DOCUMENTS

| | | | |
|---|---|---|---|
| 2,602,406 A | 7/1952 | Orter | |
| 3,476,032 A | 11/1969 | Mattly | |
| 3,660,955 A | 5/1972 | Simon | |
| 4,498,262 A | 2/1985 | Garcia | |
| 5,078,047 A | 1/1992 | Wimberly | |
| 5,487,247 A | 1/1996 | Pigg | |
| 6,061,978 A * | 5/2000 | Dinwoodie et al. | 52/173.3 |
| 6,220,956 B1 * | 4/2001 | Kilian et al. | 454/239 |
| 6,780,099 B1 * | 8/2004 | Harper | 454/186 |
| 6,843,718 B2 * | 1/2005 | Schmitz | 454/186 |
| 6,869,661 B1 * | 3/2005 | Ahr | 428/137 |
| 7,618,310 B2 * | 11/2009 | Daniels | 454/366 |
| 7,818,922 B2 * | 10/2010 | Ellis | 52/95 |
| 2003/0126806 A1 * | 7/2003 | Ellis | 52/95 |

OTHER PUBLICATIONS

Davis Energy Group, Nightbreeze™ Products Development Project, Prepared for California Energy Commission and dated Feb. 2007.
Davis Energy Group, Alternatives to Compressor Cooling, Phase V: Integrated Ventilation Cooling, California Energy Commission, dated Feb. 2004.
Maneewan et al., Heat gain reduction by means of thermoelectric roof solar collector, Solar Energy, 78 (2005) 495-503.
A laboratory Experiment on natural ventilation through a roof cavity for reduction of solar heat gain, Susanti et al., Energy and Building 40 (2008) 2196-2206.
Development and preliminary evaluation of double roof prototypes incorporating RBS (radiant barrier system), Chang et al., Energy and Building 40 (2008) 140-147.

(Continued)

*Primary Examiner* — Marc Norman
(74) *Attorney, Agent, or Firm* — Edward S. Sherman

(57) ABSTRACT

A dual air cavity roof has a continuous upper cavity which is cooled by fans, while the lower cavity is generally sealed. Preferably the cavities are separated by a radiant barrier. The fans are preferably powered by one or more photovoltaic cells that are also disposed on the roof. The roof can be pre-cooled with cooler night air and fans only activated when necessary to remove heat from the solar load on the upper cavity. When it is desirable to remove heat, the fan speed is optimized in each zone of the roof to enhance the natural convective flow to the optimum level. A radiant barrier can also cover the roof substrate, which is optionally an existing roof that is in need of repair. The roof structure is preferably assembled in parallel modules using insulating support brackets that support the outer surface and the barrier that separates the upper and lower cavity.

20 Claims, 20 Drawing Sheets

OTHER PUBLICATIONS

A combined approach for determining the thermal performance of radiant barriers under field conditions, Miranville et al., Solar Energy 82 (2008) 399-410.

Optimal Spacing for Double Skin Roofs, Lai et al., Building and Environment 43 (2008) 1749-1754.

Heat transfer in a double-skin roof ventilated by natural convection in summer time, Biwole, et al., Energy and Building 40 (2008) 1487-1497.

Experimental Investigation on air heating and natural ventilation of a solar air collector, Zhai, et al., Energy and Building 37 (2005) 373-381.

Double Skin Facades, http://en.wikipedia.org/wiki/Double-skin_facade, Jul. 1, 2010.

Double Skin Facades, Roth et al., Ashrae Journal, p. 70 and 73, Oct. 2007.

\* cited by examiner

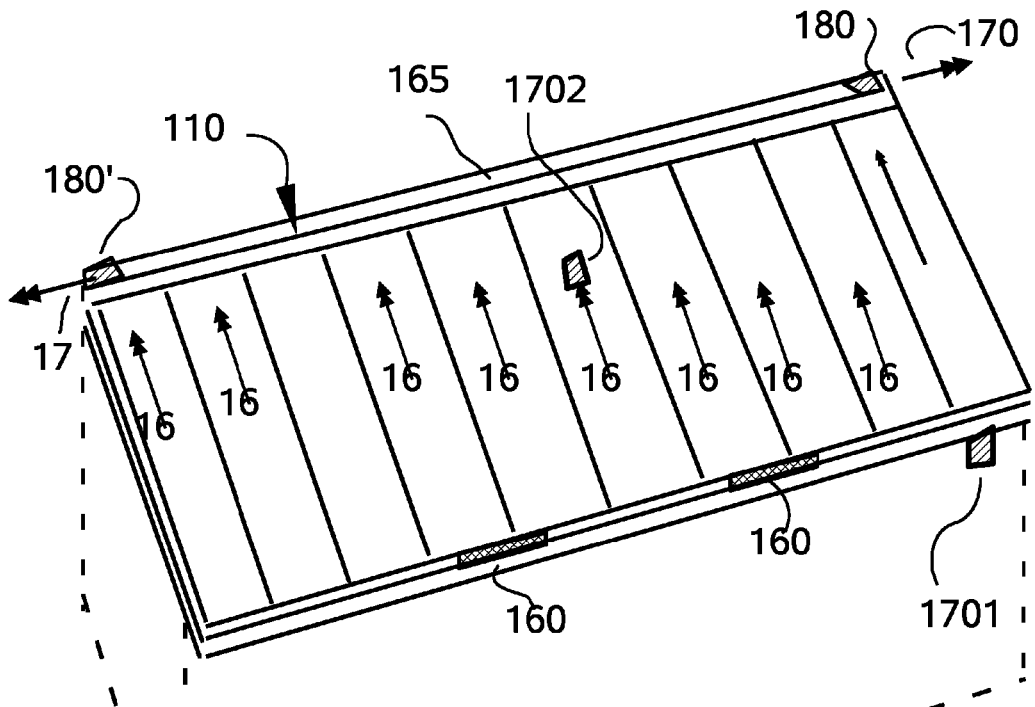
FIG. 1A
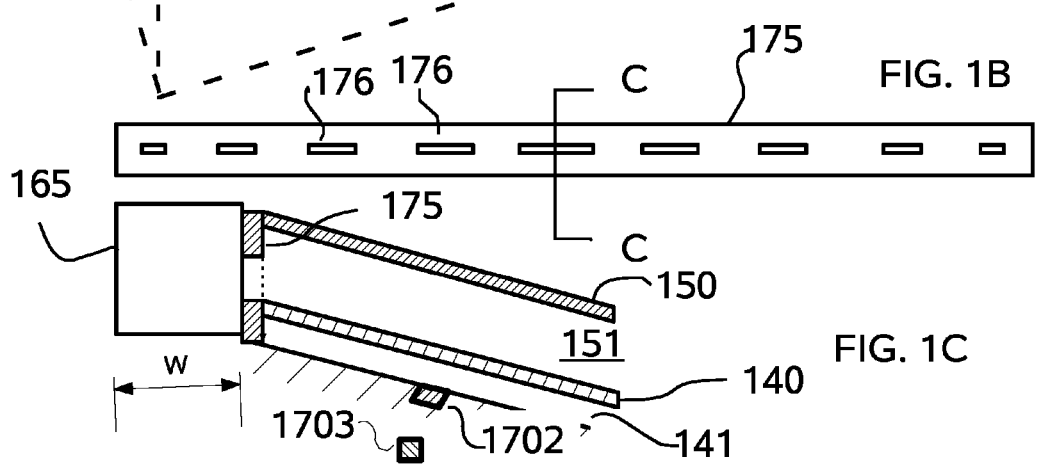
FIG. 1B
FIG. 1C

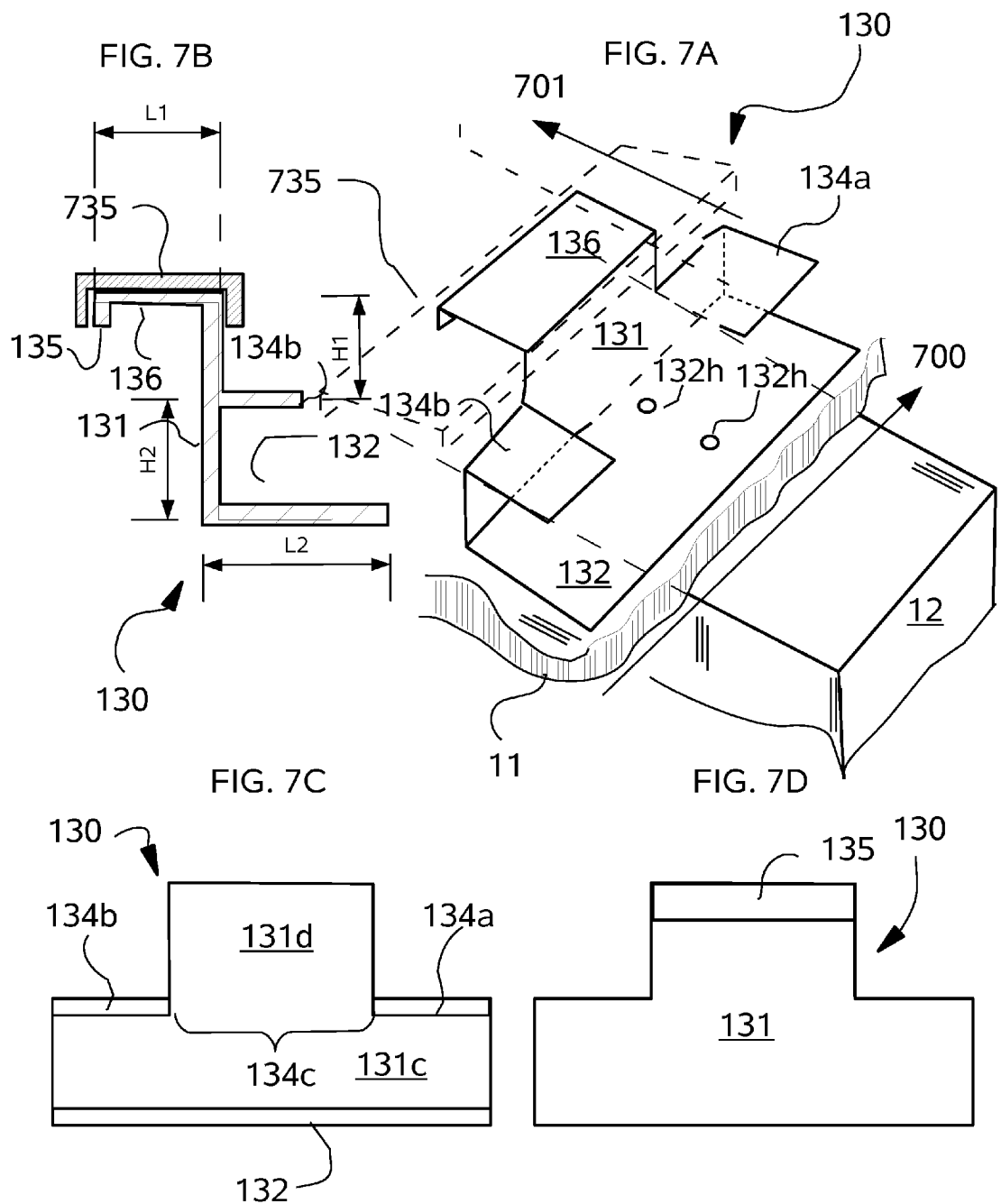

FIG. 18

SOLAR POWER AUGMENTED HEAT SHIELD SYSTEMS

CROSS REFERENCE TO RELATED APPLICATIONS

This application claims priority to the U.S. Provisional Patent application having application Ser. No. 61/226,722 for a "Solar Power Augmented Heat Shields", which was filed on 19-Jul. 2009, and is incorporated herein by reference.

BACKGROUND OF INVENTION

The present invention relates to a method of cooling buildings and structures that does not require direct external energy sources.

In warm sunny climates, air conditioning or other mechanical means for cooling dwellings, office buildings and any other structure that needs to be maintained below a critical temperature consumes significant energy, places high stress on the electrical power infrastructure and increases harmful emissions of carbon dioxide and other greenhouse gases, depending on the sources of power.

While there are alternative technologies for generating power without producing carbon dioxide and other greenhouse gases, they constitute only a small fraction of the total electrical power produced worldwide. Further, it is expected that such sources of power will grow slowly, and require significant capital investments to replace fossil fueled power plants. Currently, there are few alternative energy systems devoted to cooling structures.

Accordingly, it would be of great benefit to provide a means of reducing the need for electric power, and in particular, in climates where power is needed for cooling buildings using standard air conditioning technology.

It is therefore a first object of the present invention to provide a means for cooling buildings and structures without using additional power.

It is a further object of the invention to reduce electrical or other power consumption used to cool buildings or structures to desired temperature ranges using less air conditioning or other mechanical cooling systems.

It is a further object of the invention to reduce electrical or other power consumption/generation and the associated carbon emissions.

SUMMARY OF INVENTION

In the present invention, the first object is achieved by a providing an active cooling system disposed on the exterior surface of a building structure, the system comprising: a radiant barrier layer covering at least one exterior surface of the structure, the radiant barrier layer being generally disposed in a first plane that is co-extensive with a planar portion of the structure, a plurality of mounting brackets disposed above said radiant barrier that are connected to the exterior surface of the structure, wherein said mounting brackets support; an inner skin spaced away from said radiant barrier layer, being disposed in a second plane substantially parallel to said first plane, an outer skin spaced away from said inner skin, being disposed in a third plane substantially parallel to said first plane and second plane, wherein the region between said radiant barrier layer and the inner skin is a sealed lower cavity, and the region between said inner skin and said outer skin is a ventilated upper cavity, one or more air inlet vents disposed in fluid communication with the upper cavity at the lower lateral extent thereof, one or more air outlet vents disposed in fluid communication with the upper cavity at the upper lateral extent thereof, at least one fan disposed in fluid communication with the upper cavity to draw air in from said air inlet vents and then expel the air out from said air outlet vents.

Another object of the invention is achieved by the process for cooling a structure, the process comprising the steps of providing a structure having an outer sealed roof covered by asphalt shingles, attaching a radiant barrier layer to the asphalt shingles, attaching support brackets to the outer sealed roof over said radiant barrier layer, attaching an outer planar member to the support brackets to form a first cavity between the outer sealed roof or vertical wall and the outer planar member, wherein the support brackets provide thermal isolation between the outer sealed roof or wall and the outer planar member, providing at least one electric fan device powered by a motor in fluid communication to ventilate the first cavity disposed between the outer planar member and the outer sealed roof, providing at least one photovoltaic cell (PV Cell) coupled to the structure is electrically connected to the motor of the at least one electric fan device, exposing the at least one PV Cell to the solar radiation wherein electrical power from the PV cell powers the motor of the electric fan to circulate air through the first cavity thereby cooling the structure.

A further object of the invention is achieved by the process for cooling a structure, the process comprising the steps of providing a structure having at least one of a sealed roof and as vertical wall disposed in a first reference plane, attaching a first radiant barrier layer to the at least one of a sealed roof and a vertical wall disposed in a first reference plane, attaching a substantially planar outer skin member to the structure in a second plane spaced away from and substantially parallel to the first reference plane to define an outer cavity, providing at least one electric fan device in fluid communication with the outer cavity, providing a first means to measure the temperatures in a region between the structure and the first radiant barrier, providing a second means to measure the temperatures of the ambient air external to the structure, providing a third means to measure the temperatures within a region of the structure disposed inward from the first means to measure the temperature, providing a means to selectively control the at least one electric fan in response to the differences in temperature between at least one pair of the first, second and third means to measure temperature, wherein the means to selectively control the at least one electric fan is selectively operative to ventilate the first cavity when the temperature of the ambient air is below the temperature in the region between the structure and the first radiant barrier.

The above and other objects, effects, features, and advantages of the present invention will become more apparent from the following description of the embodiments thereof taken in conjunction with the accompanying drawings.

BRIEF DESCRIPTION OF THE DRAWINGS

FIG. 1A is a perspective view of a first embodiment of the invention showing the exterior and roof of a building structure having the inventive heat shield system deployed on the roof thereof.

FIG. 1B is an elevation view of a baffle component deployed between an internal duct of the heat shield system shown in FIG. 1A.

FIG. 1C is a cross-sectional elevation of the duct, baffle and heat shield system shown in FIG. 1B.

FIG. 6A is a cross-sectional elevation of a bracket deployed in the embodiment of FIG. 5, whereas FIG. 5B is an orthogonal exterior elevation of the same bracket.

FIG. 7A is a perspective view of another bracket, whereas FIG. 7B is a side cross-sectional elevation thereof that includes an associated intermediate mounting member, FIG. 7C is a front exterior elevation thereof and FIG. 7D is a back exterior elevation thereof.

FIG. 8A is a cross-sectional elevation of the heat shield system using the bracket shown in FIGS. 7A-D, whereas

FIG. 9A is perspective view of the cross-flow fan that is optionally deployed in the embodiments shown in FIGS. 1, 2, 10, 12, 13 and 15, whereas

FIG. 18 is an exterior elevation of an embodiment of the controller for the system shown in FIG. 17.

DETAILED DESCRIPTION

Figure 2:
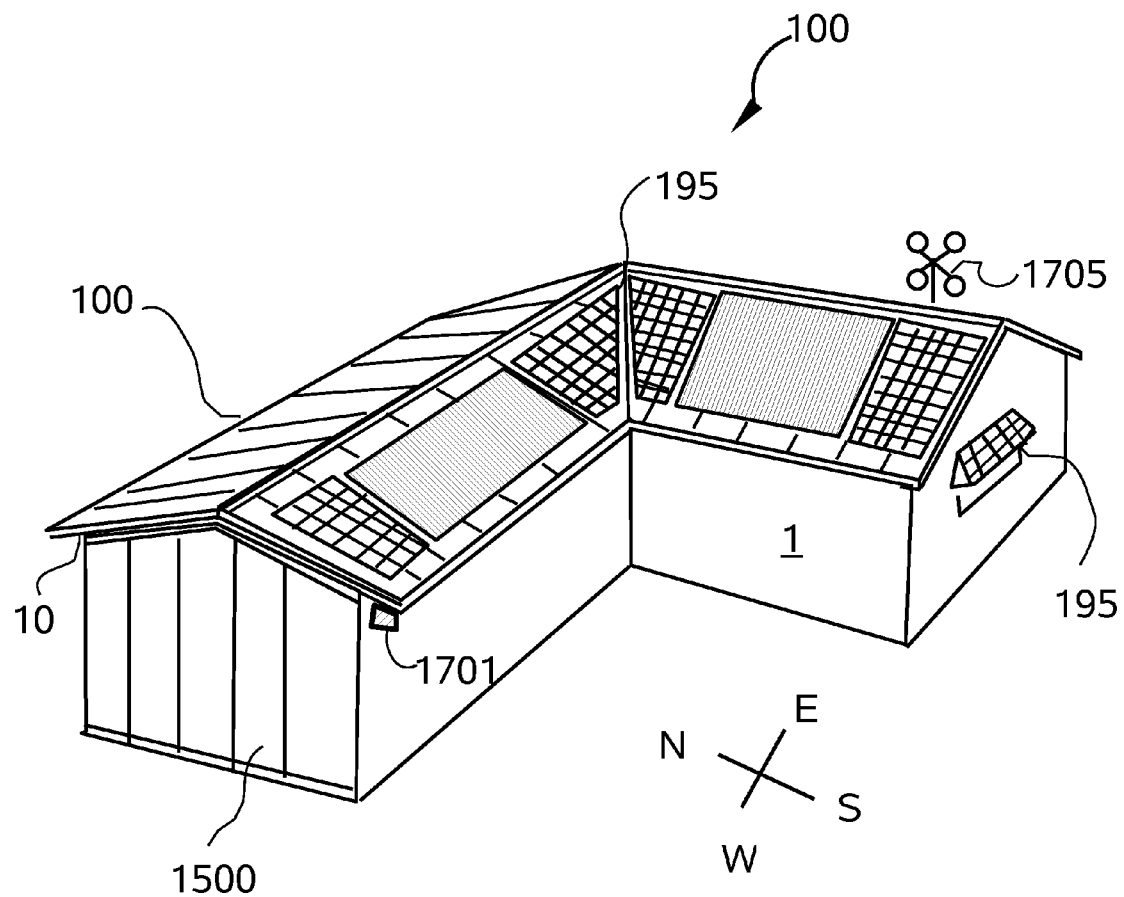
FIG. 2 is a perspective view of another embodiment of the invention showing the exterior and roof of a building structure deploying the inventive heat shield system on the roof and west facing wall, along with other preferred components of the heat shield system.

Referring to FIGS. 1 through 20, wherein like reference numerals refer to like components in the various views, there is illustrated therein a new and active solar heat shield and roof system, generally denominated 100 herein.

In accordance with the present invention the active solar heat shield and roof system 100 is deployed on a pitched or shed roof, but can alternatively be deployed on any structure or enclosure with a sealed roof surface or a vertical wall, as well as smaller structures, such as utility cabinets, storage sheds and shipping containers, and outdoor metal or plastic toilets.

FIGS. 1-4 illustrate a first embodiment in which the passive solar heat shield 100 is deployed on a pitched roof 1; and a variant thereof 1500 is deployed on a west facing (but optionally any wall) vertical wall surface. The active solar heat shield and roof system 100 is deployed on a building structure 1 having a roof or wall frame 10 and generally comprises a radiant barrier cover or layer 120 over at least one wall or roof frame of the structure 10. Mounting brackets 130 are disposed over the radiant barrier cover 120 to support the outer roof or shield layer 150 and inner roof layer 140 to define a dual skin roof 110. The inner layer 140 of the dual skin roof 110 extents substantially laterally the full extent of the roof or wall surface 10 and is air spaced off the radiant barrier 120 by the mounting bracket 130, to provide an inner cavity 141. The preferred mounting brackets also support an outer layer 150 of the dual roof skin 110, which also extends substantially the full lateral extent of the roof or wall surface provide an upper cavity 151 between the outer or shield layer 150 and the inner layer 140.

Thus, as the structure is heated by sun exposure and ambient air, the dual roof 110 provides a channel 151 for convective flow of higher temperature air to areas of low ambient air temperatures, exploiting the natural convective phenomena, such that the fan 180 assists in initiating and maintaining the convective cooling air flow in the upper cavity 151. The inner layer 141 is preferably sealed and acts as an additional insulating layer from the structure.

A radiant barrier layer 120 (see FIG. 4) is typically a thin thermal insulator surrounded or coated with low emissivity materials such as a metal, as for example a metal laminated foam resin, or quilted polymeric fiber, such as polyester or polymeric foam core type insulation bonded to reflective metalized plastic film or polished aluminum on both sides, as for example "ESP Low-E"® insulation which has a polyethylene core and polished aluminum or facing, which is available from Environmentally Safe Products Inc., of New Oxford, Pa.

Air vents 160 are provided in fluid communication with the upper cavity 151 to allow external air to enter. Preferably the air vents 160 are screened and extend continuously along the edge of the roof. Additionally, air outlets 170 are provided in fluid communication with the upper cavity 151 to allow this external air to flow from the air vents 160 and then exit cavity 151. The flowing air in cavity 151 after draws heat from outer layer 150 and inner layer 140. Further, at least one fan 180 in fluid communication with the upper cavity 151 to draw air in from the air vents 160 and dispel the heated air at outlets 170. The fan(s) 180 are thus operative to enhance the natural upward convective air flow out of the upper cavity 151, but in other embodiments may be selectively activated to pre-cool the roof system 100, depending on the time of day and the external temperature. Further, the inventive system in the most preferred embodiment includes various means 190 (see FIG. 17) to power the fans 180.

The outer roof surface 150 ideally reflects a high percentage of ambient solar or infrared (IR) energy, decreasing the incident infrared energy on the structure and the resulting solar heat gain on the building surface, and thus increasing the total solar reflectance (TSR) of the structure. The solar powered cross-flow ventilation fan 180 creates a moving air current heat-barrier, somewhat insulating the inner layer 140. The inner layer 140, via cavity 141 provides further thermal insulation to the underlying roof 10 and structure 1, thus largely preventing collateral heat gain from excess radiant heat from the outer layer 150.

Outer roof layer 150 in this embodiment is preferably a 24 gauge metal standing-seam roof or shield member. This outer roof 150 provides water and weather poof protection to the lower layers and the building structure 1. A preferred base material for the construction of the outer roof layer 150 is 55% Aluminum-Zinc alloy coated sheet steel, of which a well known commercial brand is "GALVALUME"™. Similar metal sheeting for outer layer 150 would also preferably have a high emissivity coating to provide a high Solar Roof Index (SRI). The SRI is calculated as specified in ASTM E 1980 and is a scale of 1 to 100 that is a measure of a roof's combined thermal properties. It is defined so that a standard black (reflectance 0.05, remittance 0.90) is 0 and a standard white (reflectance 0.80, remittance 0.90) is 100. Most preferably, the coating is a white thermoplastic or other white roof coatings having an SRI value as high as 104 to 110. For examples, one such coating that can be metal sheeting is CERAM-A-STAR 950® CC Series® by Akzo Nobel Coatings Inc. which is a silicone modified polyester (SMP) combined with ceramic and inorganic pigments, which is available in various grades and can have a solar reflectivity of about 0.72 and a solar emissivity of about 0.84. CERAM-A-STAR and other such coatings are available in colors other than white, but still retain high infrared emissivity, as the fillers or pigments in the coating absorb primarily visible light. As an alternative to metal the dual roof outer layer or skin 150 can be fiberboard with scrim radiant facing.

In the more preferred embodiment show fans 180 and 180' are disposed at opposite sides of the roof at the ridge to receive air from a common duct 165 disposed below outer roof layer 150 and running along the ridge between these fans 180 and 180'. A baffle 175 is disposed between the common duct 165 and the upper cavity 151. Baffle 175 has a series of apertures 176 that vary in open area, preferably via a variation in width across the horizontal expanse thereof. The variation in the aperture size allows for uniform air flow distal and proximal to the fans 180 and 180' across the width of the outer cavity 151, which is illustrated via double headed arrows 16 showing the direction of air flow from the air vents 160 toward the common duct 165. Duct 165 preferably has a square cross-section as shown in FIG. 1C, with sides having a width, W, of about 4.75", which is the same height of the baffle 175. Double headed arrows 17 show the direction of air flow exiting the duct 165 via fans 180 at air outlets 170. The motor 801 and all electrical connection to the sensors and controllers and PV-cells 195, described further below, are preferably in a waterproof housing. As shown in FIG. 1, the air vents 160 for the pitched roof are preferably screened eave vents 160.

It should also be appreciated that louvers or fins may be deployed in the space between the radiant barrier cover and dual roof skin to promote laminar air flow in upper cavity 151. In a more preferred embodiment air vents 160 are closable on the screening side to preclude wind damage or offer additional protection from fires, as well as for winter thermal isolation.

Figure 3:
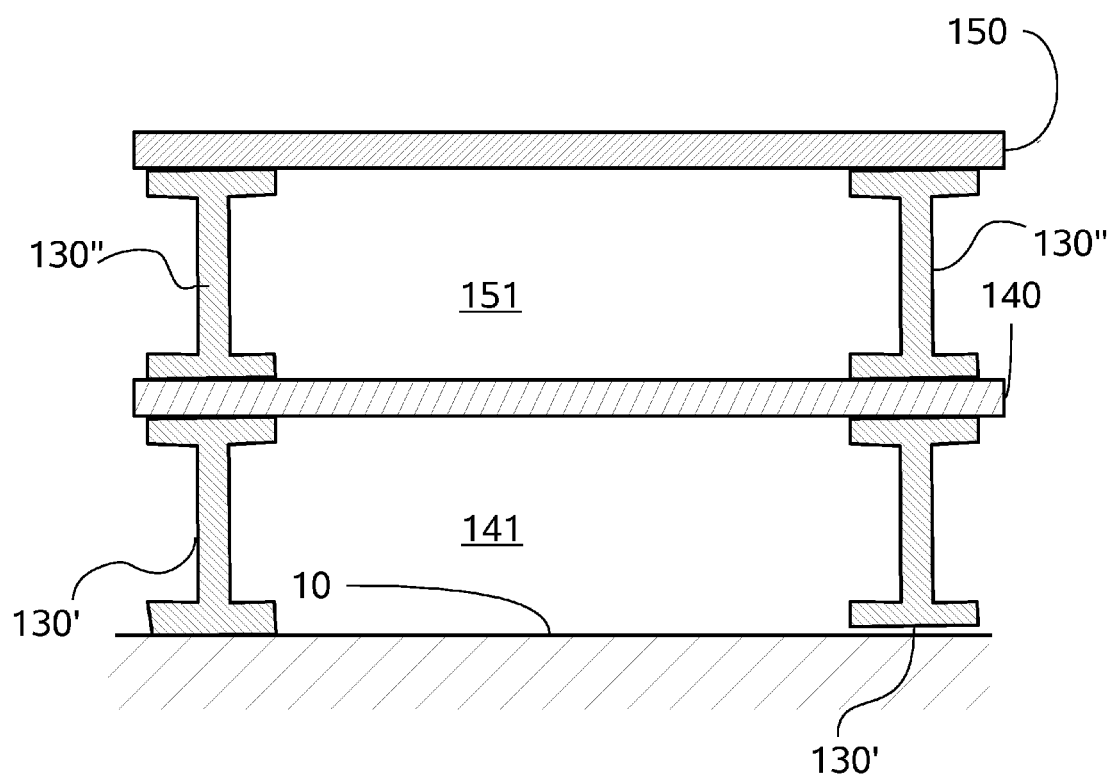
FIG. 3 is a schematic cross-sectional elevation of an embodiment of the general roof structure of the inventive heat shield system.
Figure 4:
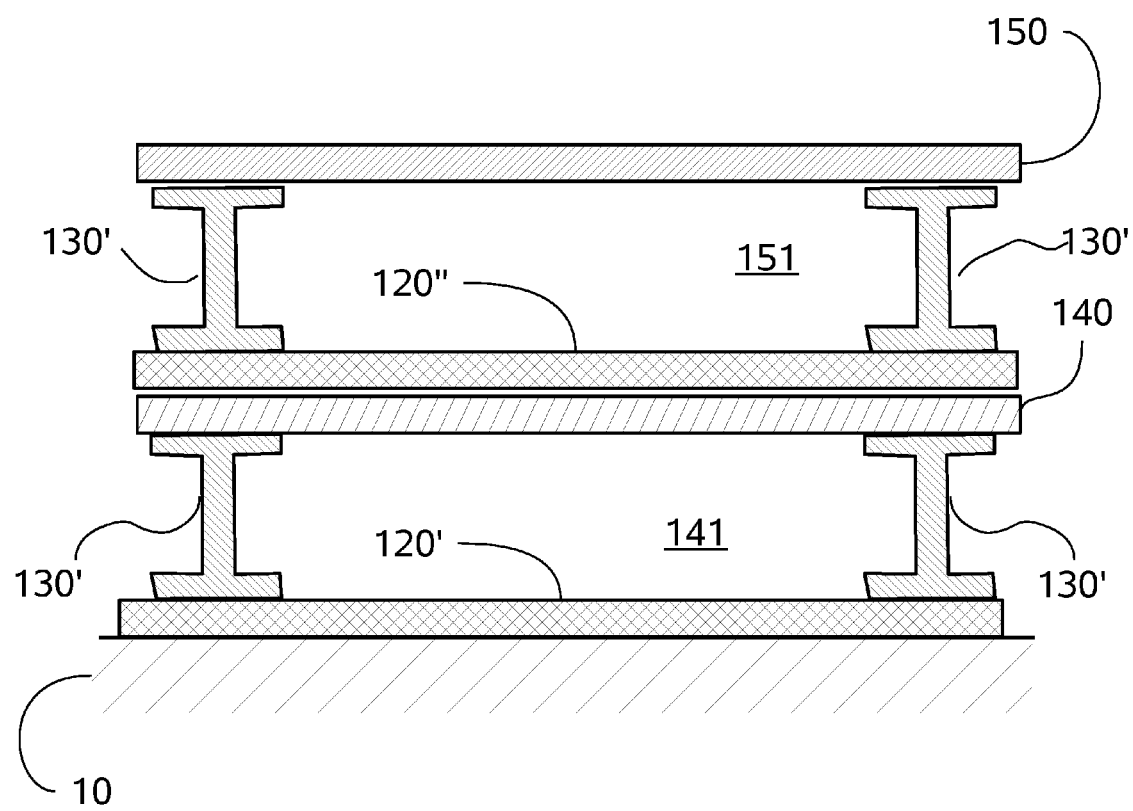
FIG. 4 is a schematic cross-sectional elevation of a preferred embodiment of the general roof structure of the inventive heat shield system.

A simple form of a bracket for supporting roof layers 140 and/or 150 is an I-beam 130 shown in FIGS. 3 and 4 in which sets of lower I-beams 130' space inner layer 140 of the surface of the roof 100, and upper I-beams 130" then space the outer layer 150 off of the inner layer 140 to define the upper cavity 151.

FIG. 4 shows a more preferred embodiment in which a first radiant barrier layer 120' is disposed on the roof inner surface 10, which is either a prior roof left in place, or plywood sheathing 11 (see FIG. 5) disposed on rafters or roof support beams 12. The inner layer 140 supports a second radiant barrier layer 120". More preferably, brackets 130 are a material with a low thermal conductivity, such as for example plastic or composite or reinforced polymer resin brackets, are preferred over metal brackets. Alternative non-metallic supports or brackets include extruded fiber reinforced engineering plastics) or steel or aluminum supports with thermal isolating layers at horizontal connecting faces.

Figure 5:
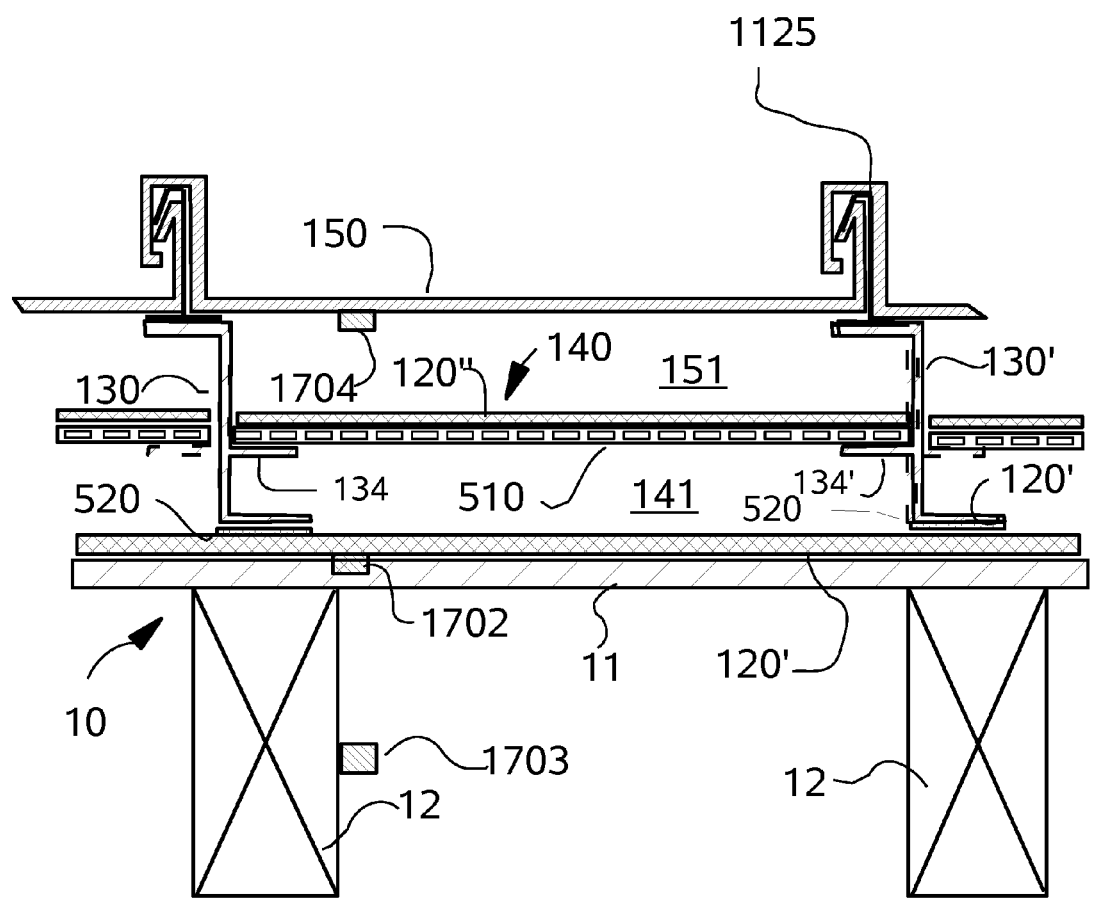
FIG. 5 is a cross-sectional elevation illustrating additional components in a more preferred implementation of the embodiment of FIG. 4.

FIG. 5 illustrates another preferred embodiment for brackets 130 and the inner layer 140. In this configuration the first radiant barrier 120' is disposed on the plywood sheathing 11 that is supporting by roofing rafters 12. Ideally, the radiant barrier 120' provides thermal insulation between brackets 130 and the attached horizontal member of the dual roof structure to minimize thermal conduction via brackets 130. It is further preferable that the brackets 130 are a material of low thermal conductivity, such as plastic or polymeric resin, or includes the optional thermal block or isolating member 520 between it and the radiant barrier layer 120'. More preferably, one or more additional thermal block or isolating members 520 would be provided where the bracket 130 connects to the outer layer 150.

In this more preferred embodiment a thermoplastic resin support panel 510 is disposed above surface 10 by brackets 130 and is in turn covered by a second radiant barrier layer 120" to form inner layer 140. Currently preferred embodiments of such thermoplastic resin panels are "COROCEL™" brand expanded high density polyvinyl sheets as well as "COROPLAST™" brand extruded twin wall plastic sheets based on high impact polypropylene copolymer, both available from Coroplast, East Dallas, Tex.

It will be appreciated from other preferred embodiments that the radiant barrier layer 120" can also provide the physical barrier to air flow between cavities 141 and 151, with member 140 acting as a physical support. Thus the radiant barrier layer 120" and any member that provides it with lateral support can be considered the inner layer 140.

Figure 6A:
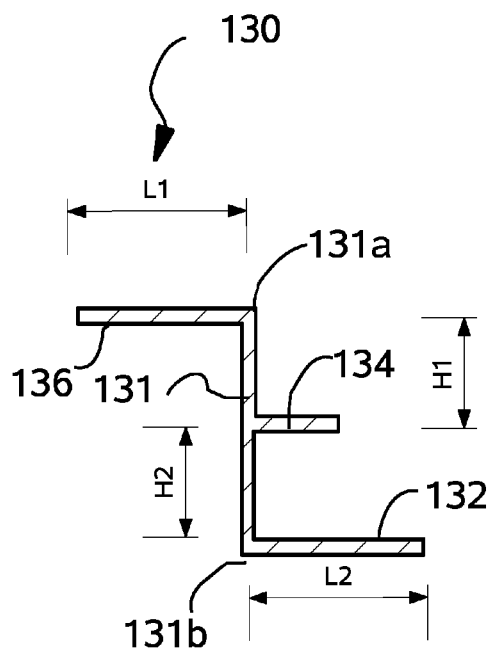
Figure 6B:
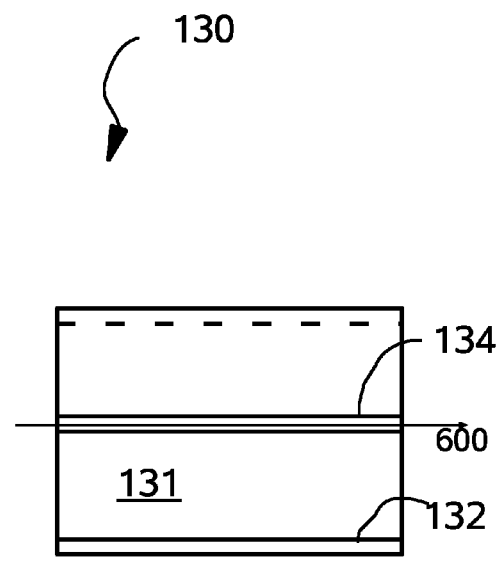

FIG. 5 also illustrates the preferred use of fewer brackets, and in particular the installation of a single set of brackets 130 on the roof surface 10 that then supports both the inner layer 140 and the outer layer 150. Various embodiments of such more preferred bracket 130 are shown in FIGS. 6-8. Bracket 130 when viewed in cross-section in FIG. 6A has a single vertical portion 131 and three additional portions extending horizontally therefrom. A lower horizontal portion or foot 132 of length L2 is for mounting to the roof surface 10, while an upper horizontal portion 136 of length L1 is for receiving in supporting engagement the outer roofing structure 150, using conventional fastener means. The lower horizontal foot 132 preferably has holes or apertures for receiving fasteners such as screws and nails for attachment or existing roof structures 10, plywood sheathing 11 or framing 12. The upper horizontal portion 136 extends horizontally from the top 131$a$ of the vertical portion 131, but preferably in the opposite direction of the lower horizontal foot 132, and does not interfere with the attachment of the lower fastener. Between the upper and lower horizontal feet is at least one intermediate horizontal member 134 that is separated from these feet by heights H1 and H2 respectively. Preferably H1 and H2 are both about 1.5 in., whereas L1 and L2 are about 3 in. This at least one intermediate horizontal member 134 is preferably extends only about half the distance L2, or about 1.5 in. to not interfere with the roof fastening process and is intended to support the inner layer 140 that divides the space between the roof surface 10 and the outer roof layer 150 into the upper cavity 151 and the lower cavity 141. The outer roof 150 is thus mounted on the adjacent upper horizontal portion 136 and 136' of brackets 130 and 130' respectively, as shown in FIG. 5. Thus, when brackets 130 and 130' are deployed as pairs, their respective intermediate horizontal members 134 and 134' face each other to support the components that form the inner layer 140.

Thus, a preferred bracket 130 is symmetric in that L1 equals L2 and H1 equals H2 so that the same bracket 130 in FIG. 5 can be rotated about its principal axis 600 by 180° to provide the brackets 130 and 130' shown on the left and right side of FIG. 5. The brackets 130 and 130' are then ideally staggered along the fall line of the roof so that the adjacent thermoplastic resin support panels 510 are supported on both sides.

As the outer cavity 151 and inner cavity 141 have a thickness corresponding to dimension H1 and H2 of bracket 130, if it is desired to provide a different cavity spacing to optimize thermal efficiency for some environments then right and left handed version of brackets 130 with support arm 134 extending in opposite directions can be deployed in pairs to provide a different H1 and H2.

An alternative embodiment of the bracket 130 and mounting system is shown in FIGS. 7A-D that now includes an intermediate mounting member 735. It should first be noted that bracket 130 is mounted with its primary axis 700 parallel to the fall line of the roof 10 such that mounting holes 132h are aligned with the center of rafter 12. This disposes the inverted "U" shaped intermediate mounting member or cross-tie strut 735 with its primary axis 701 transverse to the fall line, as the inverted cup or channel of the "U" shape mates with planar horizontal extending portion 136 of bracket 130. The planar horizontal extending portion 136 of bracket 130 also preferably terminates with a relatively short downward extending ledge 135 to provide further stiffness and support the intermediate mounting member 735. The intermediate horizontal member 134 is now subdivided to form a pair of inner shield support tabs 134a and 135b, with vertical portion 131 is now truncated to have a inverted "T" shape, as shown in FIGS. 7C and 7D, such that the lower base face 131c is wide than the upper base face 131d.

Figure 8B:
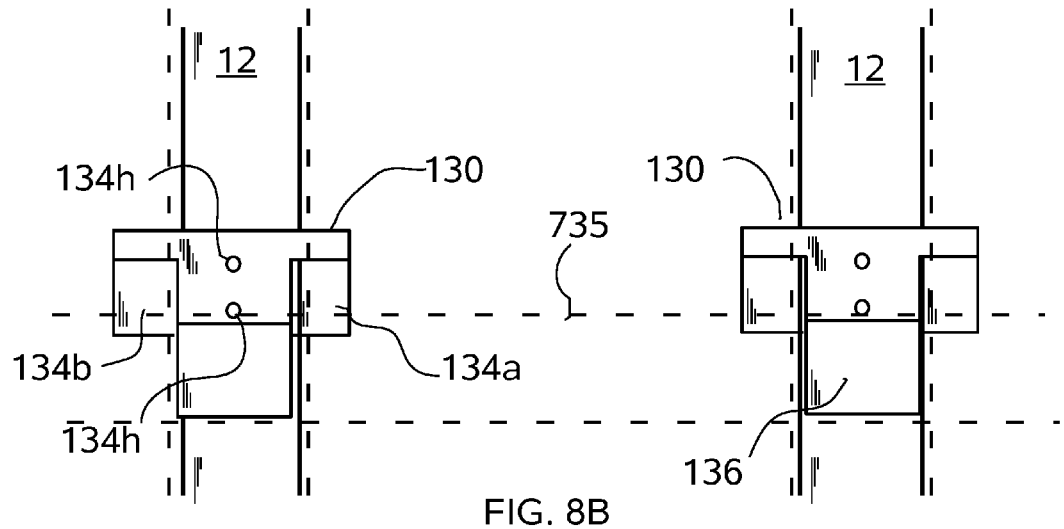
FIG. 8B is a plan view of the region shown in FIG. 8A.
Figure 8A:
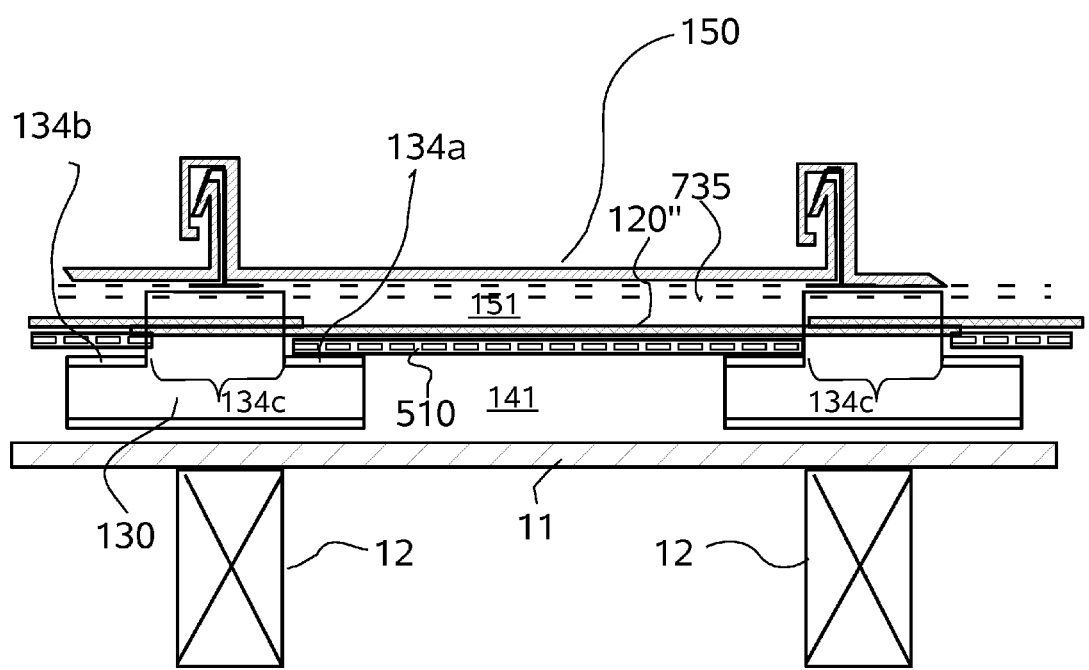

The bracket 130 shown in FIGS. 6-7 can be mounted on existing roofs as well as plywood sheathing with further attachment to the underlying roof rafters or framing 12 in several orientations. However, the configuration shown in FIGS. 8A and 8B is preferred as the all the brackets 130 in the installation are mounted in the same orientation such that the inner shield support tab 134a and 134b extend over or straddle rafters 12. As shown in FIG. 5, the thermoplastic resin support panels 510 can now rest on the inner shield tab supports 134a and 135b whereas wider sheets of radiant barrier material 120 are in turn disposed over them to form inner layer 140. As shown in FIGS. 5 and 8A, in order to prevent air flow between cavities 141 and 151, which would otherwise occur at gaps between rectangular thermoplastic resin support panel 510, it is more preferable that inner layer 140 be constructed of a lower layer. As for example, such as the thermoplastic resin support panels 510 that rest on the tabs 134a and 134b, and a second or radiant barrier layer 120" disposed thereon to cover any gaps between adjacent edges of rectangular panels. This can be accomplished by overlapping adjacent portions of the radiant barrier layer 120" associated with the upper portion 131d between 134a and 134b, denoted as 134c. Thus, radiant barrier sheets 120" should generally be wider than panels 510 to provide the overlap region 123 to cover such gaps.

Figure 9A:
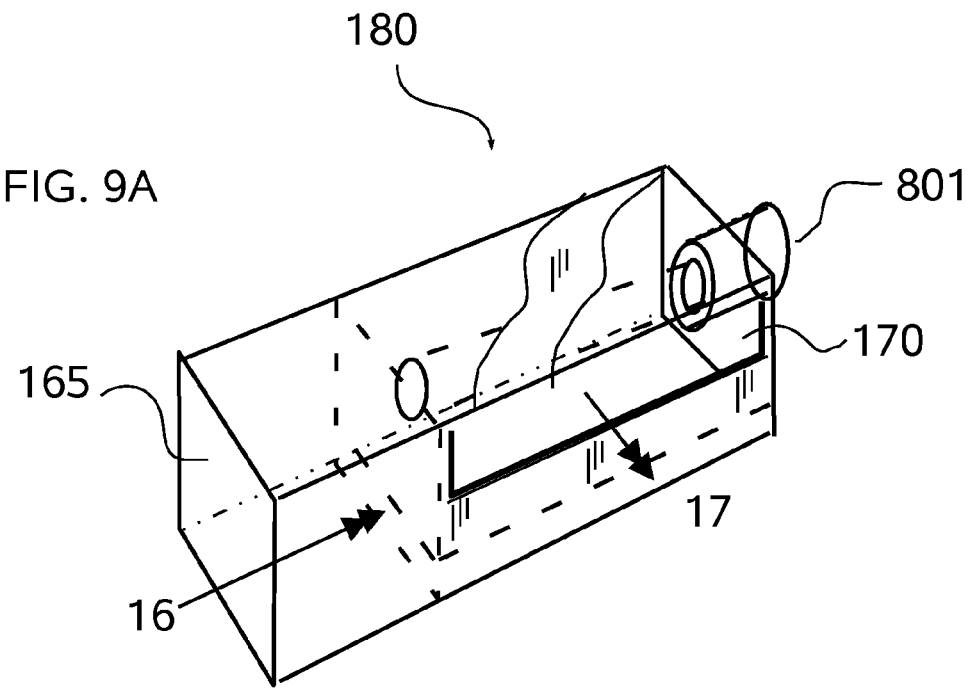
Figure 9B:
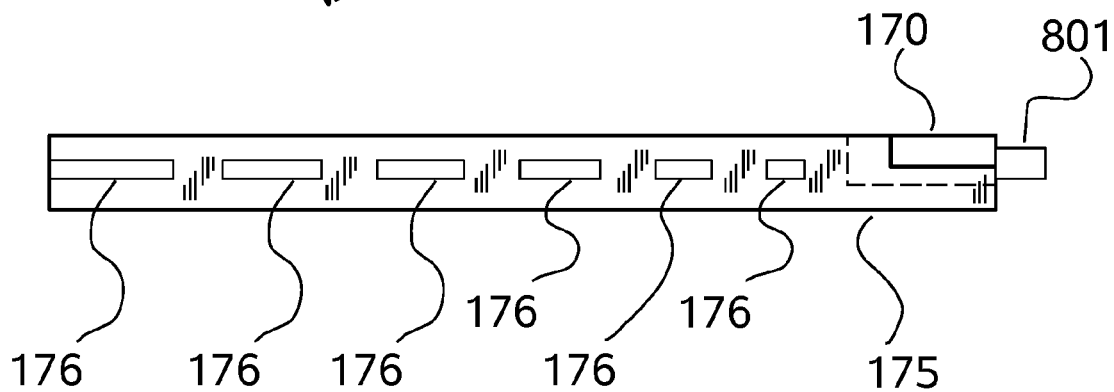
FIG. 9B is an elevation view of the associated baffle separating the duct and upper cavity.
Figure 10:
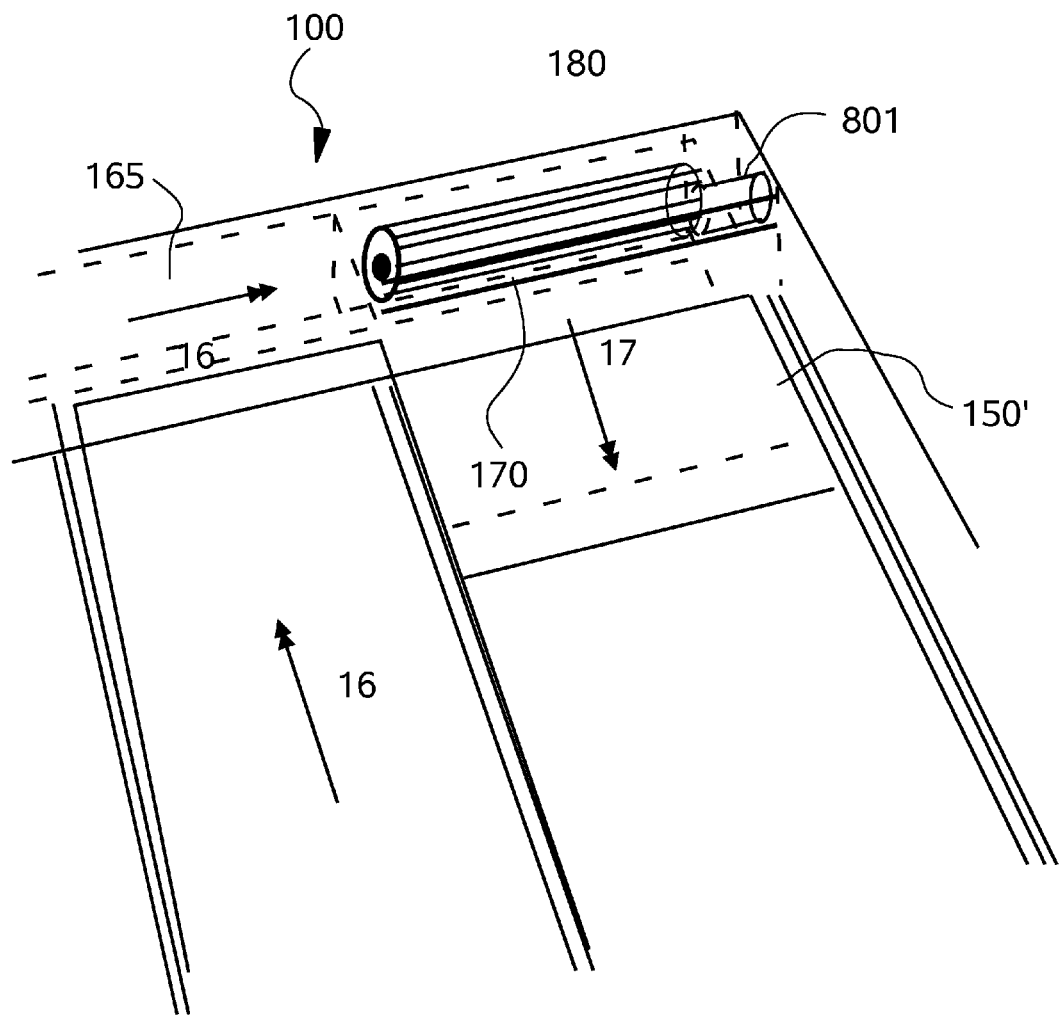
FIG. 10 is perspective view of the cross-flow fan of FIG. 9 and the adjacent roof structure and duct.

In the embodiment shown in FIGS. 9 and 10, fans 180 that deploy motor 801 are disposed at the sides of the roof at the ridge to receive air from a common duct 165. Duct 165 is below the outer roof layer 150 and runs along the roof ridge up to fans 180. The baffle 175 is disposed between the common duct 165 and the upper cavity 151 and has a series of apertures 176 that vary in open area, preferably via a variation in width across the horizontal expanse thereof. The variation in the aperture size allows for uniform air flow distal and proximal to the fans 180 and 180', via double headed arrows 16 showing the direction of air flow from the air vents 160 toward the common duct 165. Duct 165 preferably has a square cross-section as shown in FIG. 1C, with sides about 4.75" long, which is the same height of the baffle 175. Double headed arrows 17 show the direction of flow of airs exiting the duct 165 via fans 180.

Further, as shown in FIGS. 9A, 9B and 10, the outlet for air drawn through the opening 176 in baffle 175 is the cross flow fan exhaust port 170 located in the upper right cover of the baffle 175, which rather than being in fluid communication with cavity 151, is open to the external air above the exterior end panel 150' of the roof 150.

Figure 11:
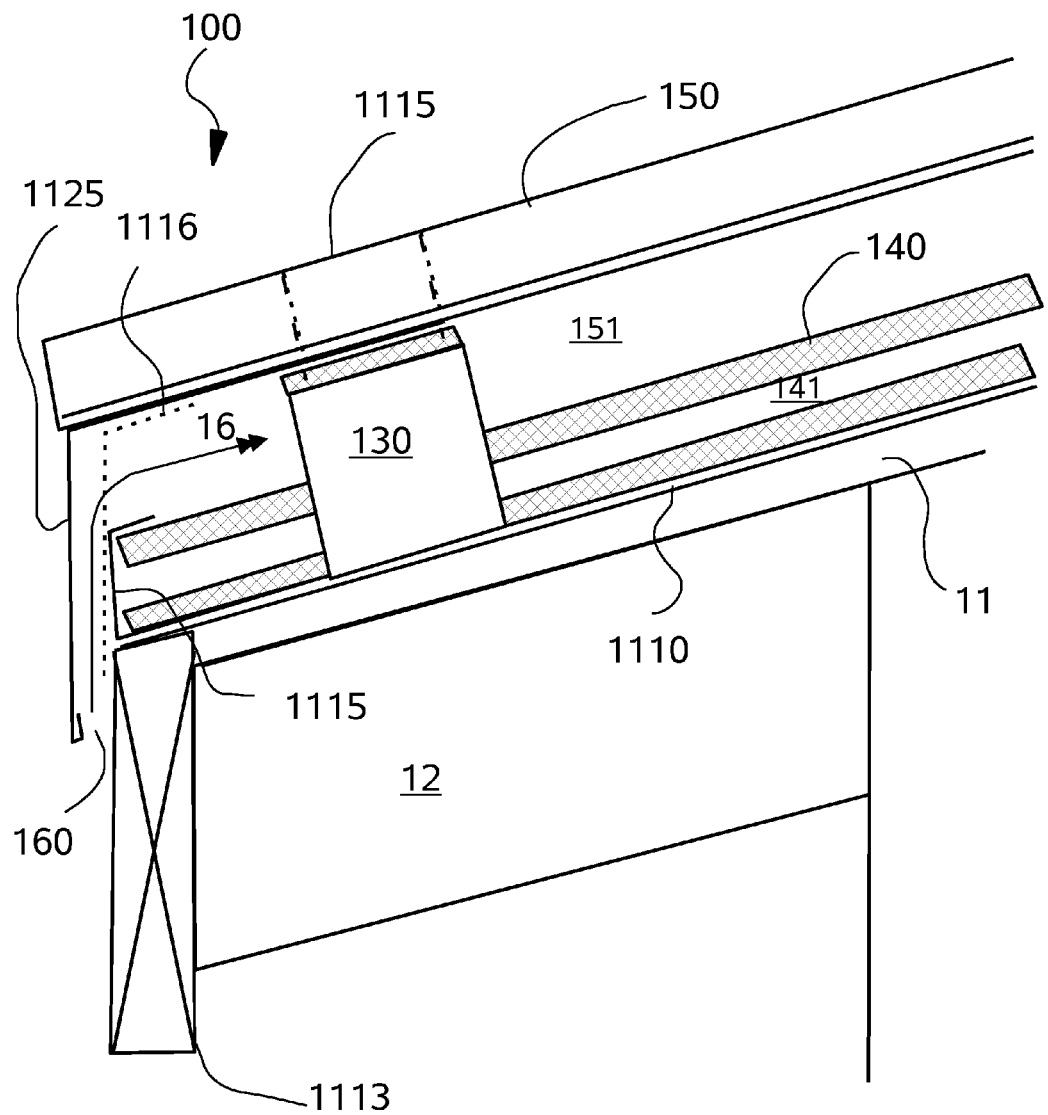
FIG. 11 is a cross-sectional elevation of an embodiment of the heat shield system at the edge of a roof showing a mounting bracket and screened eave vents and supporting framing.
Figure 12:
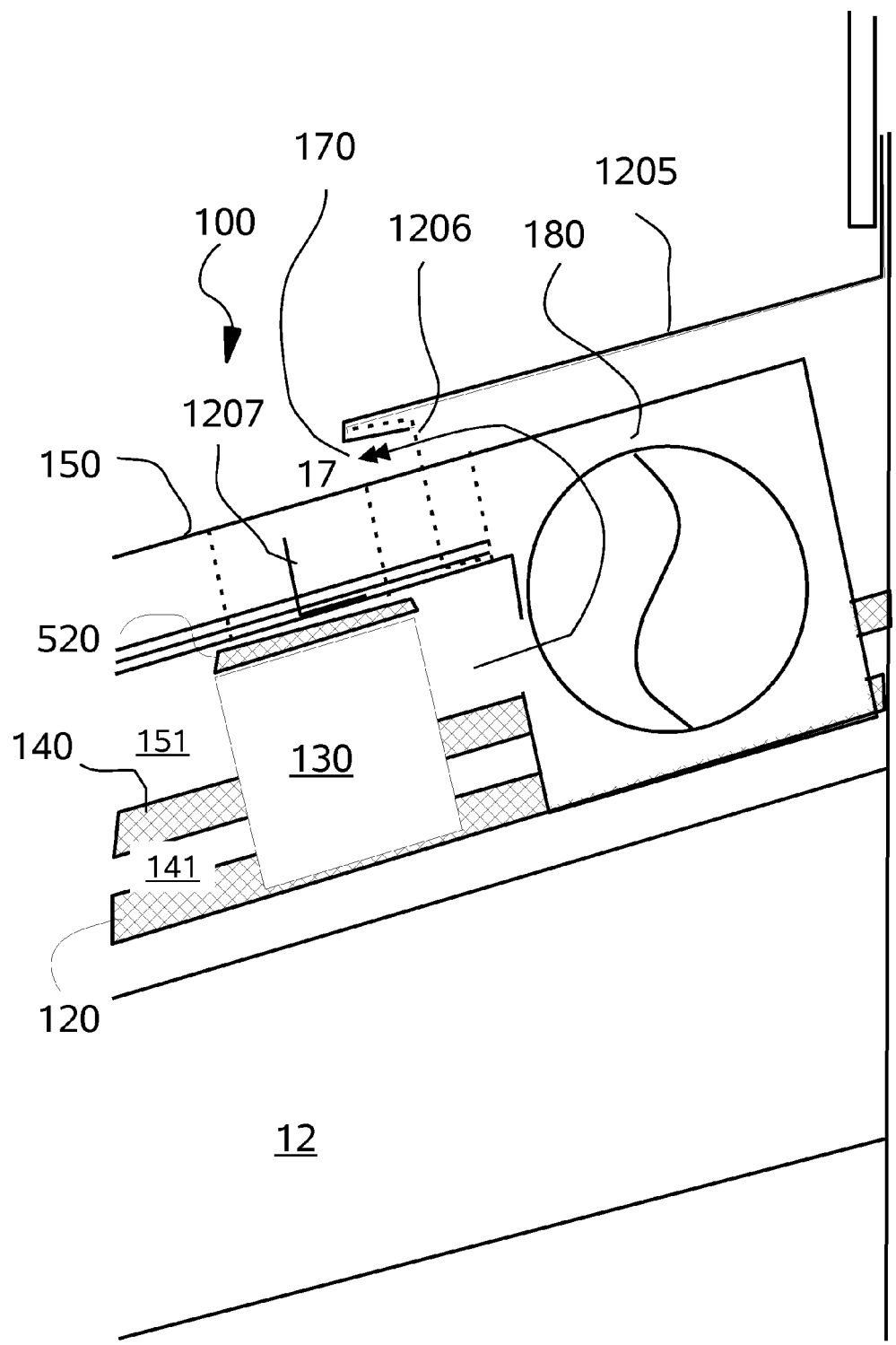
FIG. 12 is a cross-sectional elevation of another embodiment of the heat shield system showing a cross-flow fan and connected air outlet.
Figure 13:
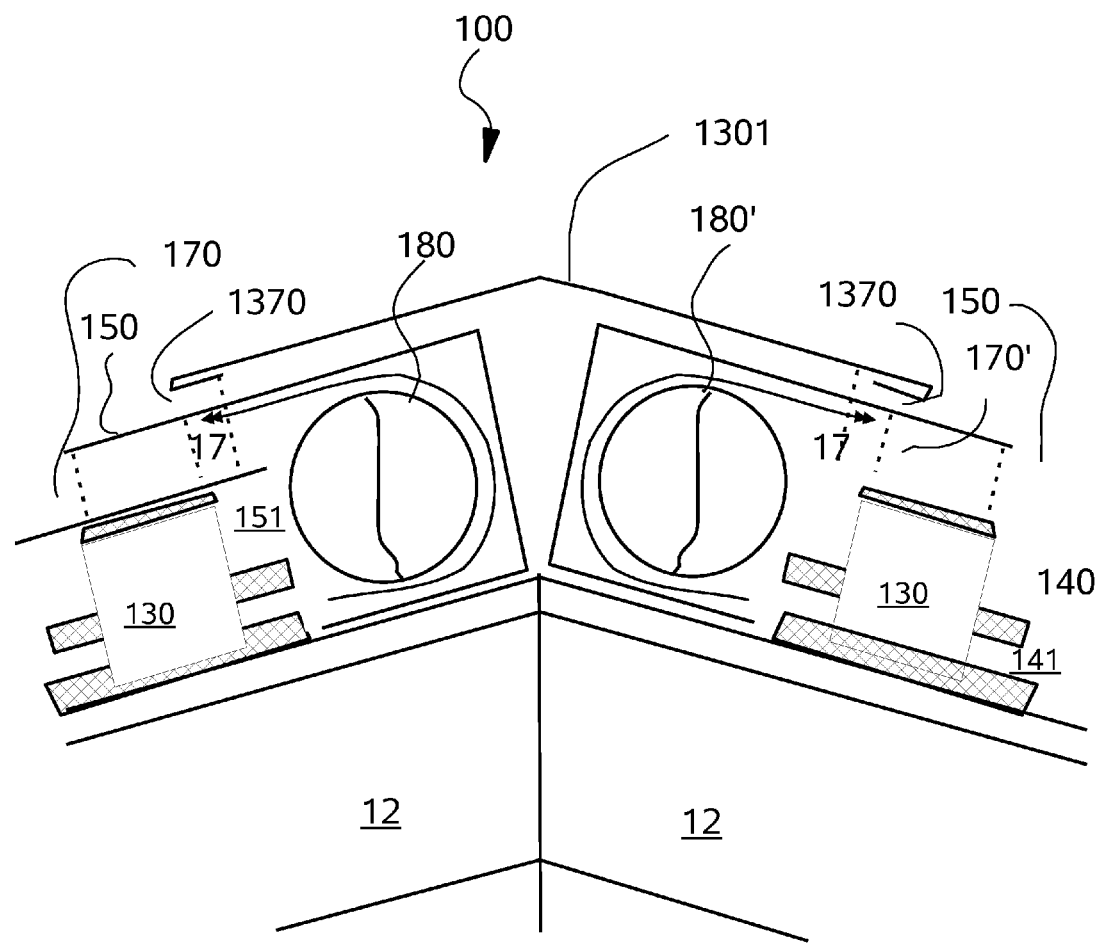
FIG. 13 is a cross-sectional elevation of another embodiment of the heat shield system showing mounting brackets and a pair of cross-flow fans and connected air outlets on opposite sides of a roof ridge.

FIGS. 11-13 illustrates further details of different embodiments of the heat shield system 100 with respect to installation on a pitched roof. FIG. 11 is a cross-sectional elevation of an embodiment of the heat shield system at the edge of a roof showing a mounting bracket and screened eave vent 16 and supporting framing 12. A water proof roof membrane 1110 is installed over the supporting framing 12 and the eave fascia 1113. The outer roof member 150 is attached to the bracket 130 by the roof panel clip 1115. A solid eave 1125 extends downward from below the end of the outer roof member 150. A perforated eave vent screen 1116 is installed in the spaced between the solid eave 1125 and the end of upper cavity 151. A "J" shaped bracket 1005 acts a closure to seal the end of the lower cavity 141 just above the eave fascia 1113.

FIG. 12 is a cross-sectional elevation of another embodiment of the heat shield system showing a cross-flow fan and connected air outlet for air flow along the direction of arrow 17 in which roof wall flashing 1205 extends over the air outlet 170. A perforated "Z" shaped member 1206 is installed to cover the air outlet 170 above outer roof member 150. An "L" shaped weather rain stop 1207 member is instated on the surface of the outer roof member 150 just below air outlet 170.

FIG. 13 is a cross-sectional elevation of another embodiment of the heat shield system 100 showing mounting brackets and a pair of cross-flow fans and connected air outlets on opposite sides of a roof ridge. The pocket formed between fans 180 and 180' by the roof ridge cap 1301 is itself vented in the usual way, having air outlets 1370 and 1370' on opposite sides. The air outlets 170 and 170' for fans 180 and 180' having the comparable structure to that illustrated in FIG. 12.

Figure 14:
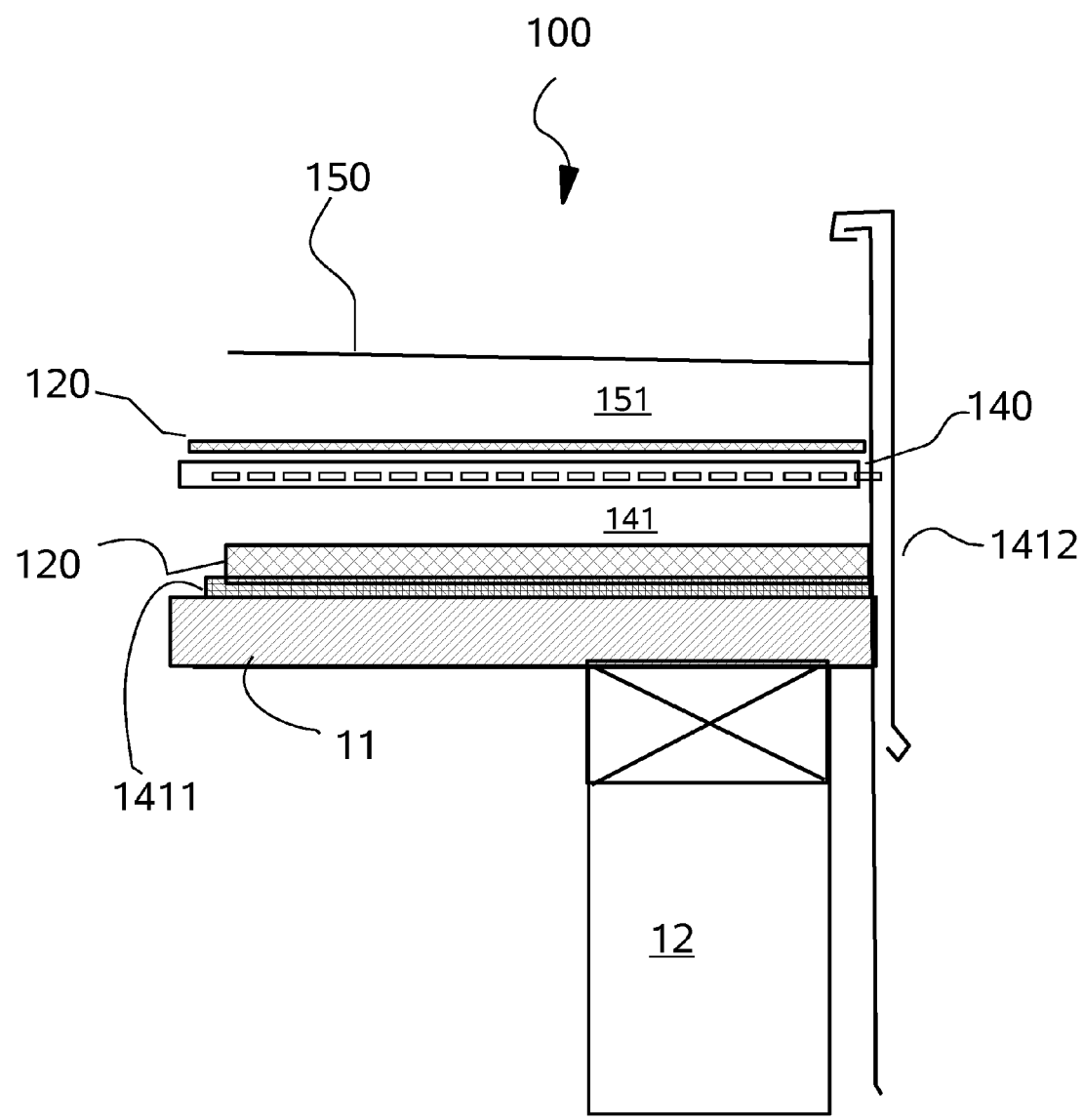
FIG. 14 is a cross-sectional elevation of another embodiment showing preferred components for implementing another embodiment of the heat shield system at the edge of a roof.

Another aspect of the invention is the installation of the inventive system, in particular in that it can be installed over existing roofs, as well as used in new construction. In the embodiment of FIG. 14, the shield system 100 is retrofit to existing roof structures to provide a cost efficient and expedient means for building's owners and/or operators to reduce the demand of electrical grid-based cooling systems that would utilize fossil fuels, hence reducing the so-called carbon emission footprint. This is particularly desirable when an existing single layer conventional roof, such as a shingle roof, shake roof and the like in need replacement due to damage or wear of the shingles 1411 disposed on roofing felt, such as 30# roofing felt. The system 100 can be advantageously constructed over other types of single layer conventional roofs that need replacement, without removing the shingles or other outer covering, and thus avoids creating waste that must be disposed of in landfills.

A first radiant barrier 120 cover is then installed directly on the shingles 1411. Then mounting brackets 130 are installed connecting to the underlying roof framing or outer sheathing.

The new outer roof structure is preferably assembled in parallel modules using insulating support brackets 130 that support the outer surface and the barrier that separates the upper and lower cavity. The rectangular inner roof skins 140 are then installed by connection to the brackets 130, followed by connecting the outer roof skin 150 to the upper portion of the brackets. In such an installation it would also be desirable to attach a gable rake trim 1412 that extends above upper roof member 150 by about 1.75 in. As with other embodiments, the lower and upper cavities 141 and 151 preferably have a height of about 1.25 in. This step, if deployed, would then be followed by the installation of the fans 180 and baffles in fluid communication with upper cavity 151. Then the fans 180 would be wired in signal communication with a controller or central processing unit (CPU) 17100 that receives inputs from a plurality of thermal sensors and at least one power source 190. This step would be followed by placing a covering on the duct that is in fluid communication between the upper cavity 151 and the fans 180, as well as any associated baffle. This controller 17100 can be a general purpose computer, depicted microprocessor, programmable logic controller (PLC) and the like.

As heat naturally rises, it is most preferable that the fans 180 are configured to operate with a controller 17100, described in further detail below, which modulates their speed and/or the duty cycle in a manner that assists the natural air current of cooler air entering channel 151 at the roof eave. In other embodiments that may be preferable in longer roof segments or in higher thermal loads where multiple PV cells and fans are deployed along the roof.

As most structures are heated by sun striking the roof and the eastern and western walls, it is expected that by installing the novel system on those portions of buildings, the need for air conditioning can be reduced greatly, thus fulfilling the objectives of the invention. Such a configuration is illustrated in FIGS. 15-16

Figure 15:
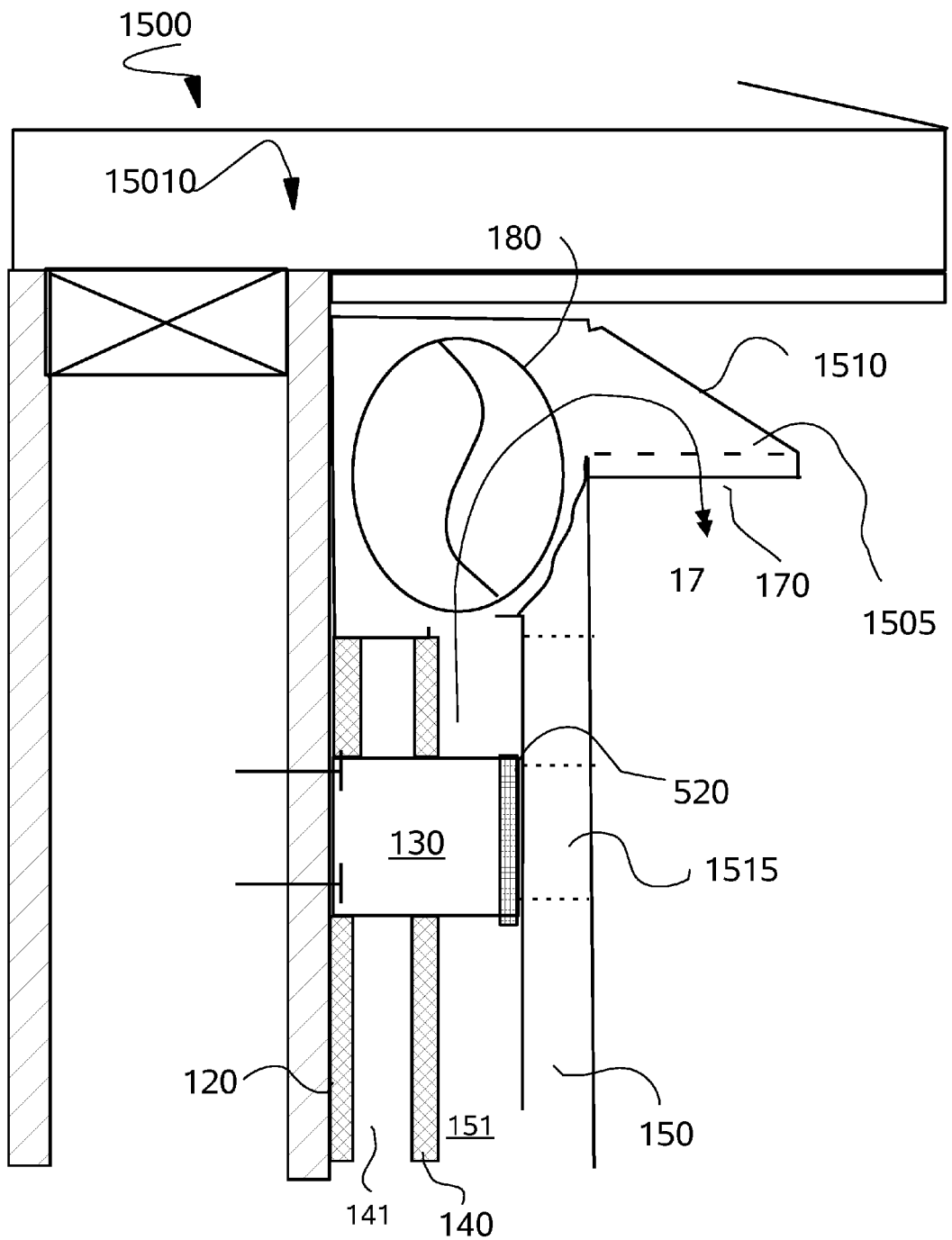
FIG. 15 is a cross-sectional elevation of another embodiment showing preferred components for implementing another embodiment of the heat shield system at the top edge of a vertical wall.
Figure 16:
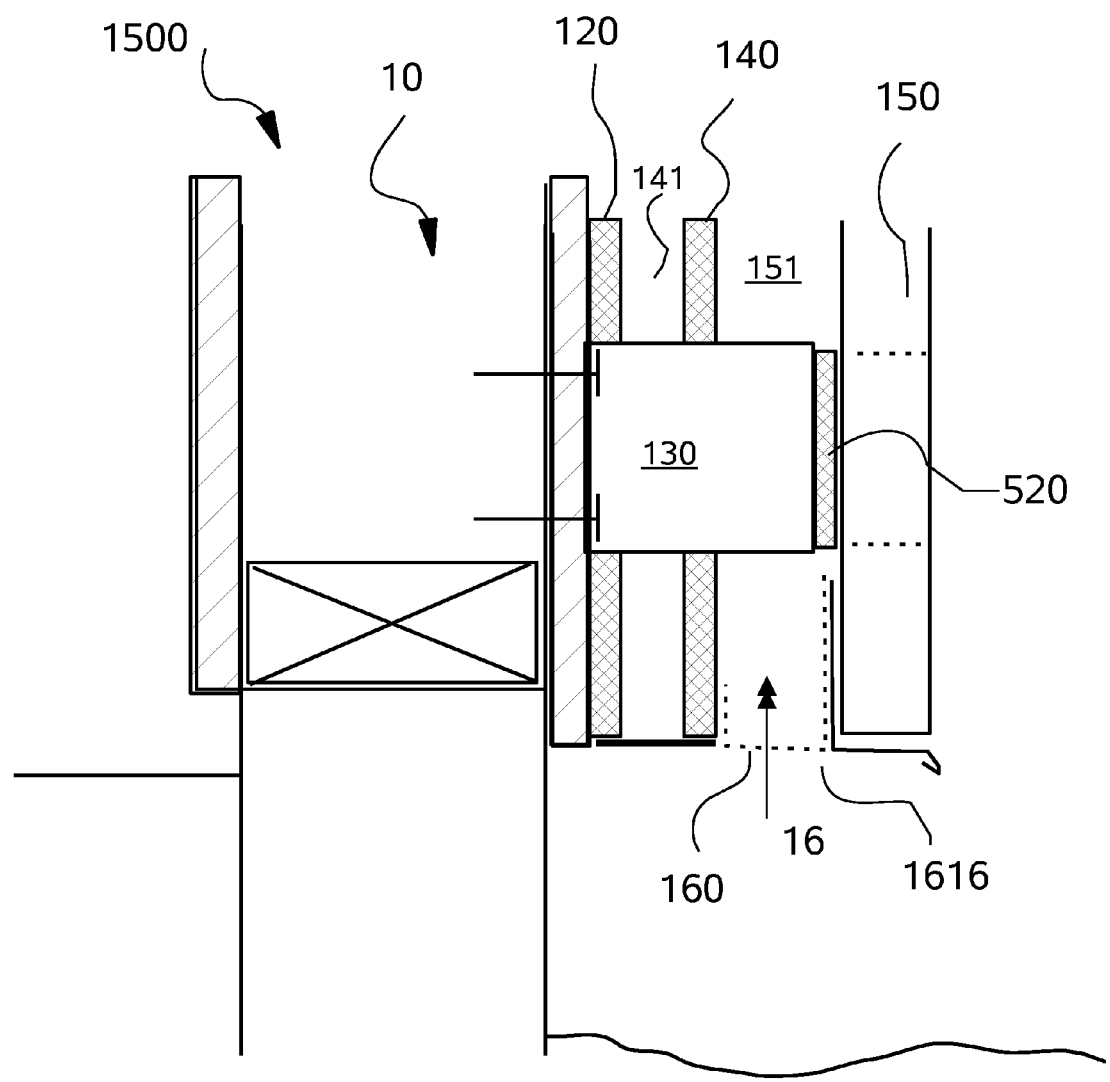
FIG. 16 is a cross-sectional elevation of another embodiment showing preferred components for implementing the embodiment of the heat shield system of FIG. 15 at bottom edge of the vertical wall.

FIGS. 15 and 16 illustrate the application of the above embodiments on the sidewall 15010 of a structure, with FIG. 15 illustrating the position of fan 180 at the top of the building sidewall with air outlet or vent 170, and FIG. 16 showing the bottom of the same wall with air inlet 160, both in fluid communication with an outer cavity 150. The inner cavity 140, formed by inner barrier layer 140, is sealed at the top in FIG. 15 and the bottom in FIG. 16.

As shown in FIG. 15, the air outlet 170 is covered by the down draft exhaust duct 1510. The down draft exhaust duct 1510 also support the insect screen 1505 that is placed in front of air outlet 170. The outer wall member 150 and inner wall member 140 are supported by bracket 130 that is either a material of low thermal conductivity, such as plastic or polymeric resin, or includes the optional thermal block member 520 between it and the connected outer wall member 150. The outer wall member 150 is connected to the structural wall 1510 via bracket 130 using an outer shield wall panel clip 1515. Bracket 130 also supports the inner wall member 140 that includes a composite radiant barrier 120' held on the previously discussed 'COROPLAST'™ backer 510. Thus, cooler outside air enters wall cavity 140 via air vents 160 protected by screen 1616.

Figure 17:
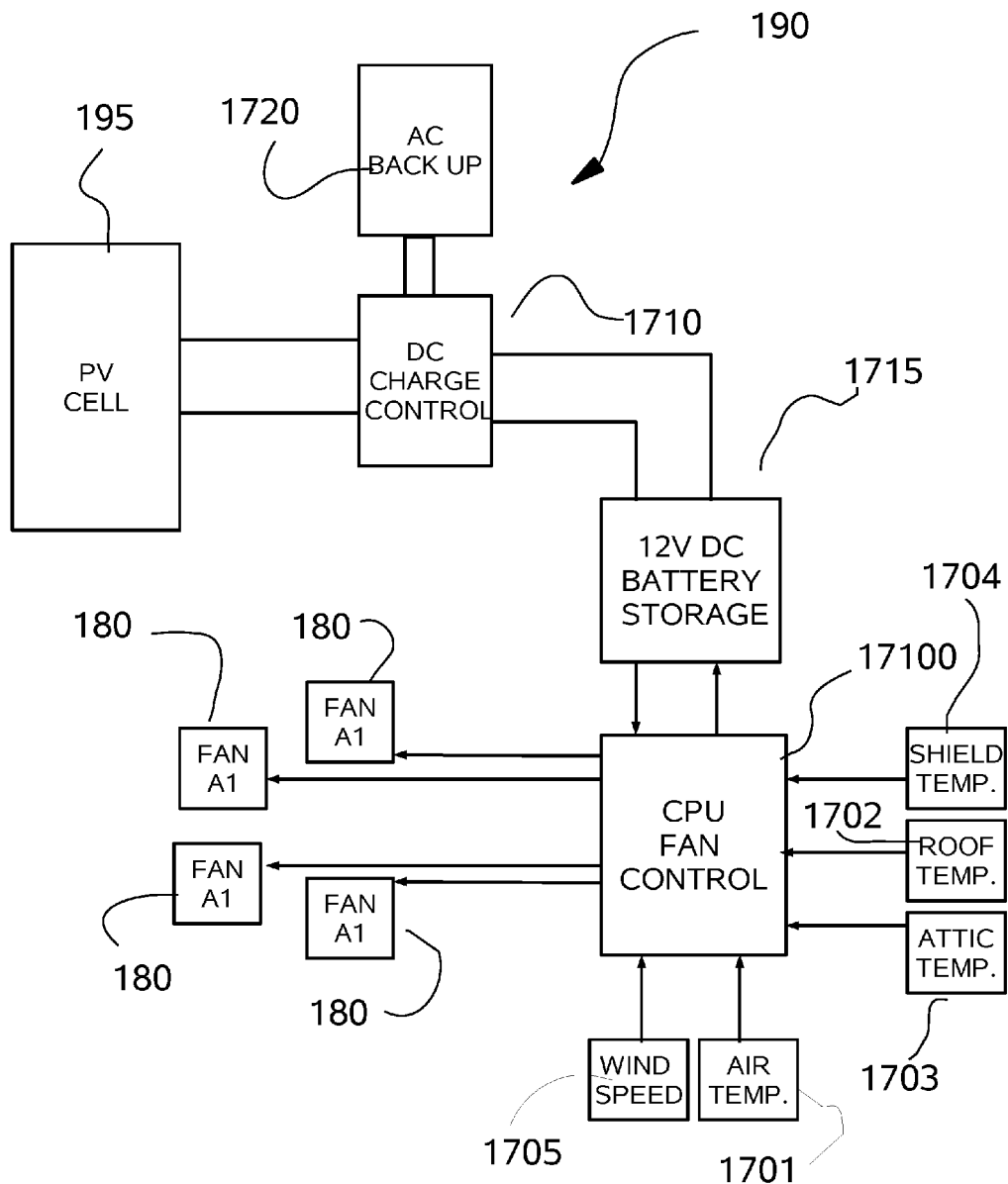
FIG. 17 is a schematic diagram illustrating the operative connections between multiple sensors, fans and a power supply system via a controller.
Figure 18:
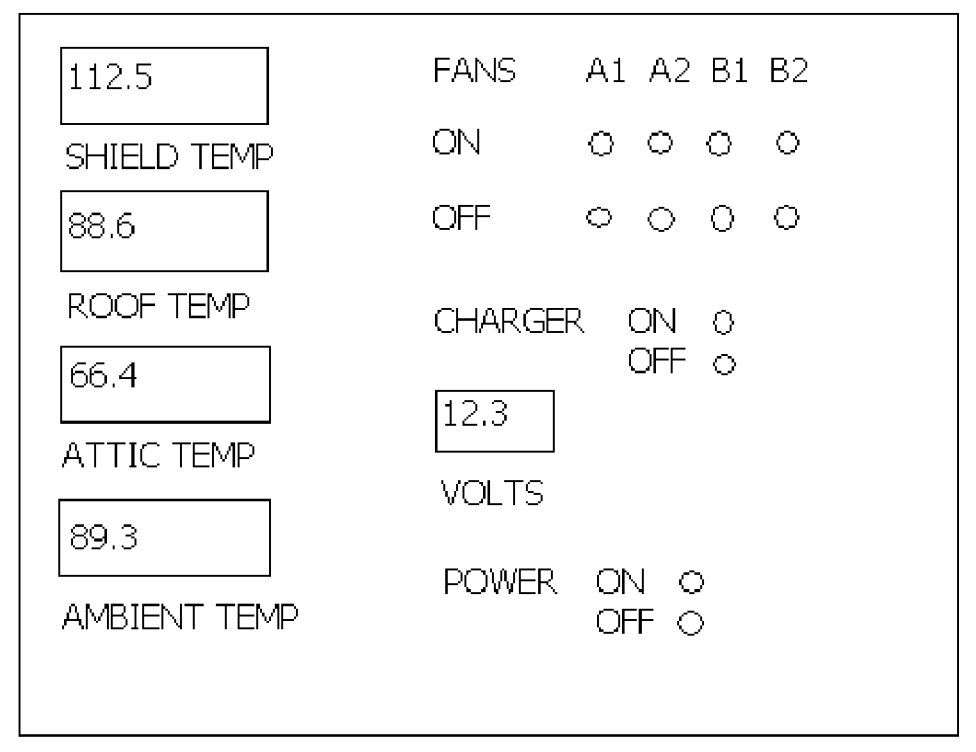
Figure 19:
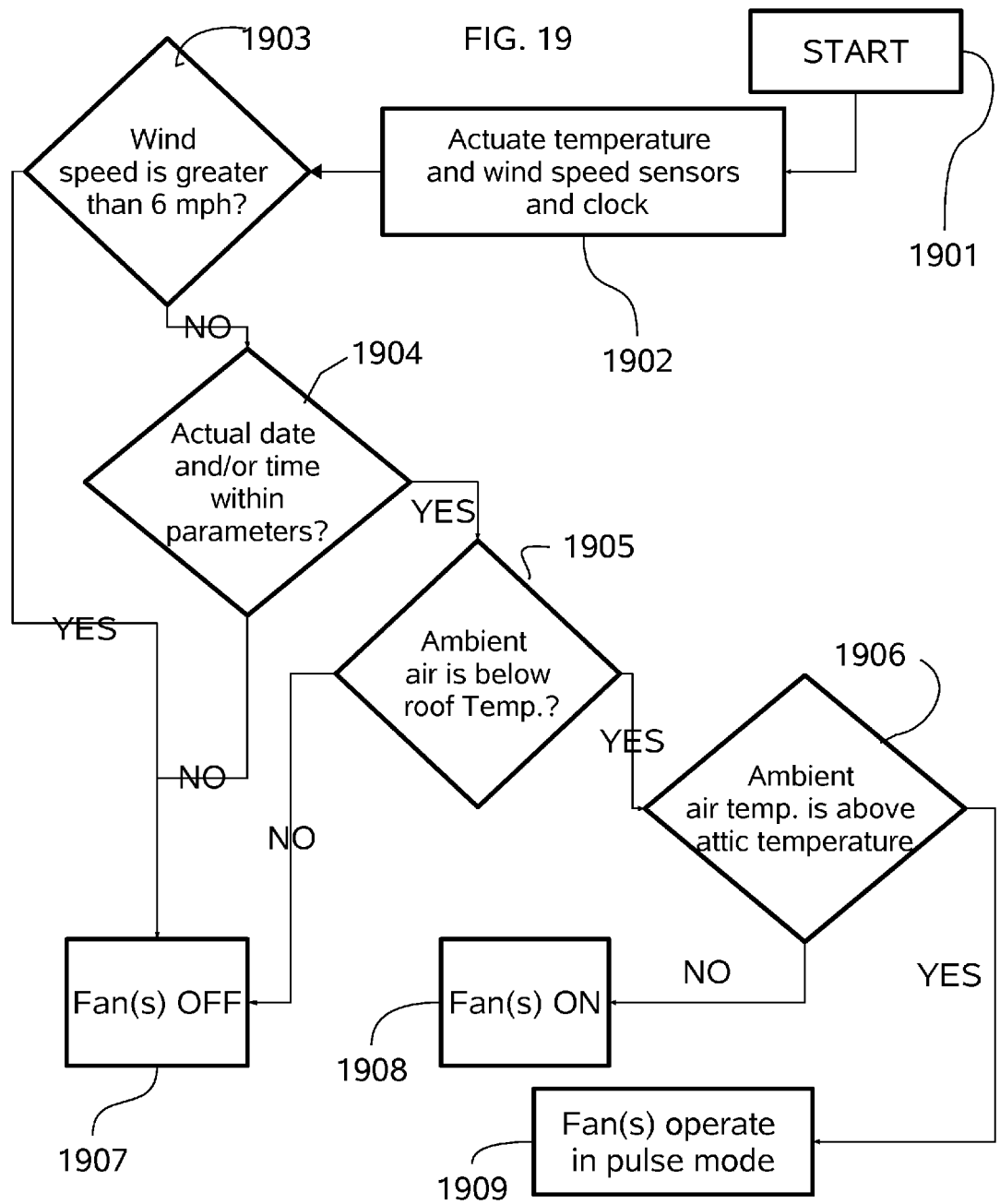
FIG. 19 is a flow chart illustrating an embodiment of the control process for the system shown in FIG. 17.

In the more preferred embodiments, system 100 includes various sensors to determine the optimum time and duration for powering fans 180 to reduce the potential for solar radiation and ambient air to heat the inside of the building or structure 1. Thus, preferably as shown in FIGS. 17-19, the fans 180 are responsive to the control system 17100 when the preferred operating conditions are met with respect to thermal, time or wind conditions. In one such embodiment, an ambient air temperature sensor 1701 is placed in shade-protected eave area at the low-side of the roof to measure the temperature of external air. A roof temperature sensor 1702 is preferably placed laterally in the upper third and center of the roof area, which is normally expected to be the warmest part of the roof, but vertically between the structural roof or wall 11 and the first radiant barrier 120'. Further, an attic temperature sensor 1703 would be placed below the roof sensor in the attic crawl space, if there is an attic. Otherwise, this attic sensor 1703 is preferably placed inside the roof frame cavity via a hole drilled from the roof side into the insulated space just above the interior ceiling, with this hole being subsequently sealed with conventional sealant.

Further, the system 100 would also preferably deploy a wind speed sensor 17005 and an internal clock in the CPU 17100. It may also be desirable to deploy a shield thermal sensor 1704 that is deployed below, but in thermal contact with the outer roof layer 150.

Thus, another aspect of the invention is the process illustrated in FIG. 17 in which the upper cavity is selectively ventilated by a plurality of fans 180 via a controller 17100 that is operative to selectively enhance the air flow through the upper gap 151 based on at least one of thermal loads, thermal measurements and exterior thermal emissivity.

It should be appreciated that the method of ventilating the structure disclosed herein can be deployed in a roof or wall protective structure having just a single air spaced cavity that is ventilated, though it would be less effective than the preferred implementation of a single closed air cavity 141 disposed below the ventilated cavity 151.

AS shown in FIG. 17, either cooling system may also include a power system for the fans 180 that also preferably the charge control module 1710, battery 1715 as well as an AC back up power source 1720, as well as one or more PV cells 195. Charge control system 1710 monitors the battery 1715 and upon detecting that the power reserves is low, then re-charges the battery from either the PV cells 195 or the AC back up power source 1720. The controller/CPU 17100 is powered from one of the battery 1715 or charge control system 1710 with the required constant DC voltage to run the microprocessor(s) or programmable logic controller (PLC) there within. Provided the power required by the operative fans 180 is met by the output of the PV Cells 195, they are generally used rather than draining the battery 1715, but when the PV Cells 195 provide insufficient output, the charge control system 1710 is operative to power the fans 180 by the AC back up power source 1720.

Thus, it is also preferred that the system 100 deploy circuit protection devices between the fan motor wiring connection to the PV cell 195 to assure the applied voltage and current will be at minimum levels to prevent damage before powering the fan motor(s) 180.

FIG. 18 is an example of an external indicator for such a control system that displays the temperature at the above sensors, the operating status of the fans 180 and the status of the charger and battery charge level.

FIG. 19 illustrates an embodiment of the control process for the system 100, starting at step 1901, after which the above temperature sensors 1701, 1702 and 1703 are provided and actuated, along with a wind speed sensor 1705, and a clock in step 1902. Then, in step 1903, a determination of wind speed is made. If the wind speed in greater than a predetermined value, in this example about 6 mph, the fans 180 are shut down in step 1907, until the system detects a change in wind speed. When the wind speed is less than 6 mph, control proceeds to step 1904, in which the time of day is determined. Preferably, the fans 180 will also be limited in operation to the appropriate time of day and season or date so that maximum benefit is obtained from cool night air in the summer, and the roof system 100 retains heat at night in the winter. Thus, depending on the pre-set or predetermined time and date consideration, the fans 180 could subsequently be turned off again in step 1907. However, depending on local conditions the clock times and dates leading to non operation of the fans might be different or not necessary.

If the time/date for turning on the fans 180 in step 1904 is appropriate, control moves to step 1905, in which the ambient external air temperature from sensor 1701 is compared with the temperature of the roof as measured by sensor 1702. When the ambient air temperature is above the roof temperature, then control moves to step 1907 in which the fans are turned off. It would also be preferable that under such condition, the controller 17100 would be further operative to charge the battery when PV Cell 195 generated power is not needed to run the fans 180.

If the ambient air temperature is below the roof temperature, then control moves to step 1906. In step 1906, ambient external air temperature from sensor 1701 is compared with the temperature of attic, or the temperature sensor disposed below the roofing member that supports the first radiant barrier 120', as measured with sensor 1703. When the ambient air temperature is above the attic temperature, then the fans 180 are operated in step 1909 in a pulse mode. As a non-limiting example of the pulse mode of operation, the fans might run for about 2 minutes, and then pause for 13 minutes, that is operating about 8 minutes per hour. When the ambient air temperature is not above the attic temperature, then the fans 180 are operated continuously in step 1908. The intermittent operation of step 1909 is intended to remove excess heat in cavity 151, without overheating the underlying structure from the warmer ambient air. It should be appreciated that this example of pulsed operation or limited duty cycle is not intended to be limiting, and may include a method of modulating the fans, including a lower speed of operation that assist natural convention of air form cavity 151.

It should also be appreciated that at reaching any of steps 1907-1909, the process re-starts at regular intervals in step 1901, should thermal, clock or wind conditions change. Such internals can range from fraction of a second to scores of minutes if desired.

It is generally not necessary to run the fans 180 when the wind speed exceeds a predetermined value, as the wind itself ventilates the cavity 151 and externally removes heat from the exterior roof 150 by convection.

Moreover, to the extent that the geographic region of the installed system 100 has large differences between the evening or night temperature and day time temperature, further steps may be taken to initially draw cool air into cavity 151 at night or early in the morning, but not operate the fans 180 until a predetermined temperature is reached, and thus avoid faster heating of the roof and structure from the ever warming ambient air in the later hours of the day.

While the controller 17100 for air flow is thus primarily responsive to ambient temperatures and air flow, it can also be programmed to account for the local solar exposure and thermal absorption and emissivity of roof, which depend at least in part on color.

For ambient conditions where rapid changes occur in temperature, wind, and weather, the controller may preferably have a rate change anticipation circuit which will signal the fans to activate when sensing rapidly rising temperature rates or to shut down the fans when rapidly dropping temperatures occur because of weather changes. This will have small but significant energy savings effects on the battery.

It should be further appreciated that the process shown in FIG. 19 is preferably applied to each zone of the roof system 100 having separately operable fans 180 associated with drawing ambient air into different roof or wall cavity portion 151, each having its own local thermal sensors. Thus, depending on the time of day and shading by the environment the portion of the roof receiving the most direct solar exposure only portions of the roof might be ventilated by this process.

It should also be appreciated that the control of fans 180 can operate in a proportional control mode, as well as a proportion-integral-derivative control and thus also be logically dependent on the rate of temperature change, as in the manner of proportional temperature controller, rather than or in addition to absolute temperature control. Thus, the cooling air flow into cavity 151 may be initiated when the rate of heating as measured by thermal sensor 1703 exceeds a predetermined value or a combination of a predetermined temperature and predetermined value, so that the cooling is more effective in preventing the attic air from exceeding another predetermined temperature limit. Such a control scheme would preferably be in a feed forward control mode, and take into account for the time it would take to cool the roof based on the ambient air temperature, the time of day, the time of year and or the thermal absorption and emissivity of the materials that form the outer roof member 150.

It should be further appreciated that each fan 180 needs a connection to the power source, the means for switching the fans between the on and off states, as well as their optional speed control can be at the power source or at the fans. To the extent the switching is at the fans, or between the fan and the power source, the switching signals can be sent over a separate wiring system, or as a pulse train superimposed on the power distribution line to the fan motors 180.

Although the preferred fan configuration has vertical rotary axis parallel to roof surface and perpendicular to slope direction, as shown in FIG. 9 other types of fans may also be deployed. While a preferred location for this type of fan is at the top ridge and side to pull air from the roof via baffle or manifold to provide a uniform pressure drop and hence substantially uniform lateral airflow across the upper cavity 151, other types of fans may be advantageously situated in alternative locations.

Figure 20:
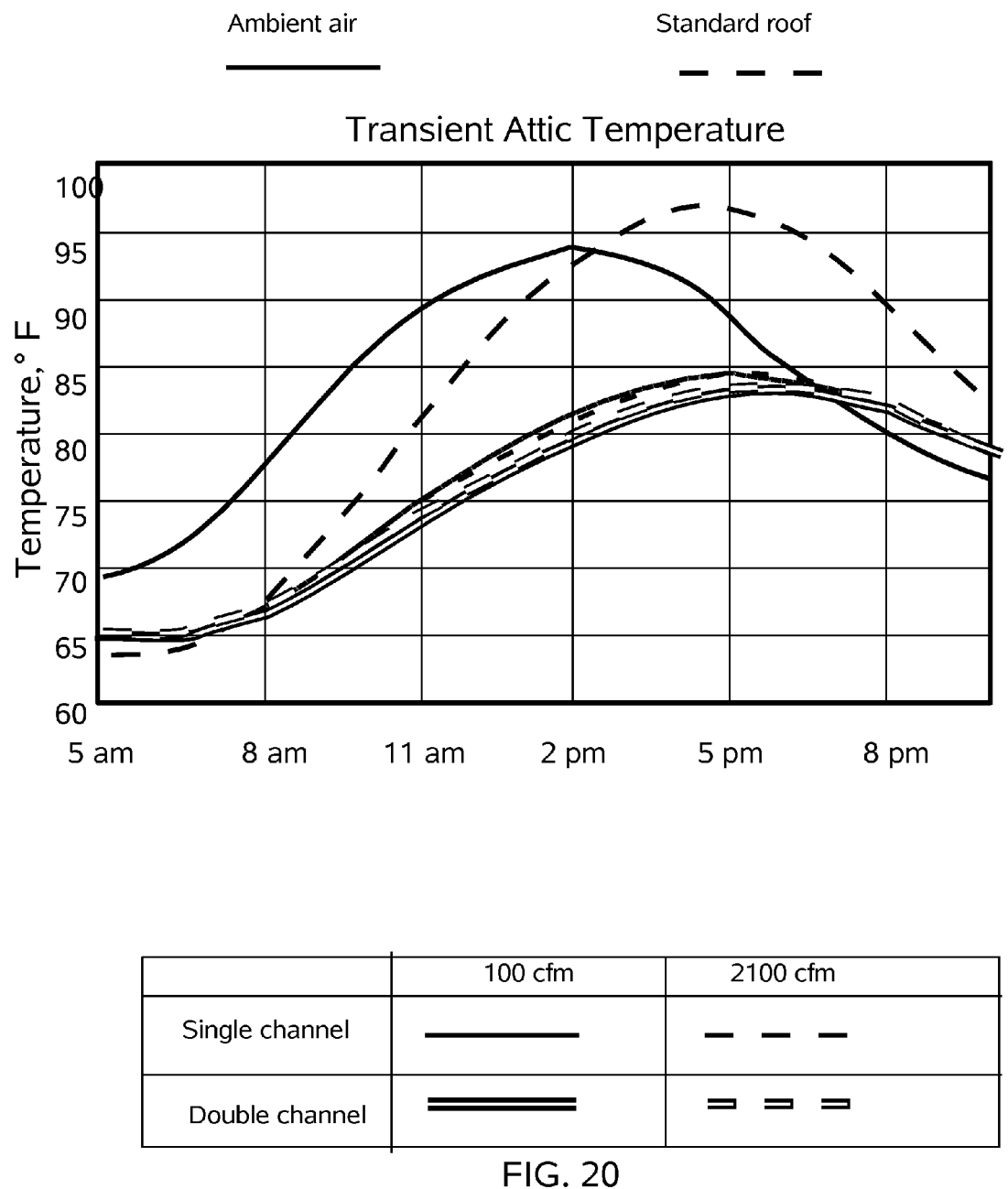
FIG. 20 is a chart showing the predicted performance of various embodiment of the inventive system during the daytime.

FIG. 20 is a graph of the temperature variation during the day (from about 5 am to about 10 pm) illustrating the performance of various embodiments of the inventive system as predicted by a computer model for an 8 ft. by 10 ft. prototype roof using weather conditions for an "average summer day" in Yuma, Ariz. The computer predictive model was developed from actual experimental data collected on prototypes deployed in Northern California. The chart compares the performance of the heat shield system with a single cavity ventilated cavity against the inventive dual cavity system at air flow rates of 110 cfm and 2100 cfm with a conventional shingle roof. The lines associated with the different conditions are indicated as a matrix in the legend of this figure for double and single cavity roofs at the two air flow rates. This simulation also shows that the external air temperature, which peaks at about 93° F. at about 2 pm, will result in a conventional roof heating the attic to about 97° F. between 4 to 5 pm. A ventilated single cavity roof reduced this maximum temperature to about 85° F., and slightly delayed the time at which this temperature is reached till slightly after 5 pm. The double cavity system disclosed herein reduced the peak temperature further to about 83° F., and also delays the peak temperature to slightly later in the evening. The differences in attic temperature between air flow rates of 110 cfm and 2100 cfm were not significant under these model conditions.

Thus, it appears that the structure cooled by the novel method and structures will need less power to cool the interior of a structure with air conditioning, as well as for fewer hours during the day. This early afternoon cooling is significant, as in warm climates electricity demand tends to peak during these hours as the interior of houses become warmer from heat conducted inward from the roof, as well as the owners returning and turning up the air conditioning to reduce the internal temperature to a more comfortable level.

Structures to be cooled using the various embodiments of the system 100 disclosed herein include, without limitation dwellings as well as commercial buildings, storage sheds, silos, animal shelters, coop and barns, warehouses, tents, garages, sidewall less structures, tents, utility cabinets and portable toilets, even if such structures would not normally be air conditioned.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

We claim:

1. An active cooling system disposed on the exterior surface of a building structure, the system comprising:
    a) a radiant barrier layer covering at least one exterior surface of the structure, the radiant barrier layer being generally disposed in a first plane that is co-extensive with a planar portion of the structure,
    b) a plurality of mounting brackets disposed above said radiant barrier that are connected to the exterior surface of the structure, wherein said mounting brackets support;
        i) an inner skin spaced away from said radiant barrier layer, being disposed in a second plane substantially parallel to said first plane,
        ii) an outer skin spaced away from said inner skin, being disposed in a third plane substantially parallel to said first plane and second plane,
        iii) wherein the region between said radiant barrier layer and the inner skin is a sealed lower cavity, and the region between said inner skin and said outer skin is a ventilated upper cavity,
    c) one or more air inlet vents disposed in fluid communication with the upper cavity at the lower lateral extent thereof,
    d) one or more air outlet vents disposed in fluid communication with the upper cavity at the upper lateral extent thereof,
    e) at least one fan disposed in fluid communication with the upper cavity to draw air in from said air inlet vents and then expel the air out from said air outlet vents.

2. An active cooling system according to claim 1 further comprising a plurality of PV cells disposed on the outer surface of the structure to receive solar radiation and connected provide power to said at least one fan.

3. An active cooling system according to claim 2 and further comprising a plurality of thermal sensors disposed to measure and compare the temperatures in different portions of the active cooling system.

4. An active cooling system according to claim 3 further comprising a controller that is operative to modulate the operation of the said fans in response to measured differences in temperatures.

5. An active cooling system according to claim 1 wherein each mounting brackets has:
    a) a vertical extending body having an upper end and a lower end;
    b) a horizontal base extending laterally from the lower end of the vertical extending body connected to the structure;
    c) upper arms that extend horizontally from the upper end of the vertically extending body that connect to and support the outer skin;
    d) lower arms that extend horizontally from between the upper and lower end of the vertically extending body that connect to and support the inner skin.

6. An active cooling system according to claim 5 wherein the upper and lower arms of said brackets extend in opposite directions from said vertical extending body.

7. An active cooling system according to claim 1 wherein the inner skin further comprises a second radiant barrier.

8. An active cooling system according to claim 7 wherein the inner skin further comprises a thermoplastic resin support panel that is supported by said brackets and wherein the second radiant barrier is disposed on said thermoplastic resin support panel.

9. An active cooling system according to claim 8 wherein lateral gaps between said thermoplastic resin support panels are covered by laterally extending portions of the second radiant barrier to seal the lower cavity.

10. An active cooling system according to claim 1 further comprising;
    a) a common duct in fluid communication with the upper cavity that extends along the upper lateral extent thereof,
    b) a baffle disposed to laterally extend between said common duct and the upper lateral extent of the upper cavity,
    c) wherein a pair of fans are disposed at opposite ends of said common duct at a corresponding pair of air inlet vents for expelling air from the common duct, and
    d) said baffle has a plurality of apertures along the length thereof to provide substantially uniform air flow across the width of the upper cavity in the direction of said duct.

11. An active cooling system according to claim 1 wherein said mounting brackets provide thermal isolation between the outer skin and the radiant barrier covering.

12. An active cooling system according to claim 11 wherein said mounting brackets are metal and the active cooling system further comprises thermal block members disposed between each mounting bracket and the radiant barrier layer.

13. A process for cooling a structure, the process comprising the steps of:
    a) providing a structure having a outer sealed roof in need of replacement,
    b) attaching a radiant barrier layer to the outer sealed roof,
    c) attaching support brackets to the outer sealed roof over said radiant barrier layer,
    d) attaching an outer planar member to the support brackets to form a first cavity between the outer sealed roof or vertical wall and the outer planar member, wherein the support brackets provide thermal isolation between the outer sealed roof or wall and the outer planar member,
e) providing a common duct in fluid communication with the first cavity that extends along the upper lateral extent thereof,
f) providing a baffle disposed to laterally extend between said common duct and the upper lateral extent of the first cavity, wherein said baffle has a means to provide substantially uniform air flow across the width of the upper cavity in the direction of said duct,
g) providing at least one electric fan device powered by a motor in fluid communication with the common duct to ventilate the first cavity disposed between the outer planar member and the outer sealed roof,
h) providing at least one photovoltaic cell (PV Cell) coupled to the structure is electrically connected to the motor of the at least one electric fan device,
i) exposing the at least one PV Cell to the solar radiation wherein electrical power from the PV cell powers the motor of the electric fan to circulate air through the first cavity thereby cooling the structure.

14. A process for cooling a structure, the process comprising the steps of:
a) providing a structure having at least one of a sealed roof and as vertical wall disposed in a first reference plane,
b) attaching a first radiant barrier layer to the at least one of a sealed roof and a vertical wall disposed in a first reference plane,
c) attaching a substantially planar outer skin member to the structure in a second plane spaced away from and substantially parallel to the first reference plane to define an outer cavity,
d) providing at least one electric fan device in fluid communication with the outer cavity,
e) providing a first means to measure the temperatures in a region between the structure and the first radiant barrier,
f) providing a second means to measure the temperatures of the ambient air external to the structure,
g) providing a third means to measure the temperatures within a region of the structure disposed inward from the first means to measure the temperature,
h) providing a means to selectively control the at least one electric fan in response to the differences in temperature between at least one pair of the first, second and third means to measure temperature,
i) wherein the means to selectively control the at least one electric fan is selectively operative to ventilate the first cavity when the temperature of the ambient air is below the temperature in the region between the structure and the first radiant barrier.

15. A process for cooling a structure according to claim 14 wherein the means to selectively control the operation of the at least one electric fan further is operative to ventilate the first cavity in a pulsed mode when;
a) when the temperature of the ambient air is below the temperature in the region between the structure and the first radiant barrier, and
b) the temperature of the ambient air is above the temperature within the region of the structure disposed inward from the first means to measure the temperature.

16. A process for cooling a structure according to claim 14 further comprising means to measure wind speed the means to selectively control the operation of the at least one electric fan further is only operative ventilate the first cavity when the wind speed is below a first predetermined value.

17. A process for cooling a structure according to claim 14 further comprising means to determine the time, wherein the means to selectively control the operation of the at least one electric fan further is only operative ventilate the first cavity when time is between two predetermined values.

18. A process for cooling a structure according to claim 14 wherein the process further comprises provided a sealed air spaced inner cavity between the first radiant barrier and the outer cavity.

19. A process for cooling a structure according to claim 14 wherein the process further comprises provided a second radiant barrier between the sealed air spaced inner cavity and the outer cavity.

20. A process for cooling a structure according to claim 14 and further comprising the steps of providing;
a) a battery to provide electrical power to the electrical fan,
b) at least one PV Cell to charge the battery,
c) wherein the means to selectively control the at least one electric fan is selectively operative to charge the battery from the at least one PV Cell when the at least one electric fan is not being energized,
d) wherein the ambient air temperature and the temperature of the least a portion of the sealed roof or vertical wall is selectively operative to at least one of;
i) actuate fans to draw in outside air and pre-cool the space when ambient temperature is below the temperature of the at least a portion of the sealed roof or vertical wall,
ii) modulate the fan speed to achieve the optimum air flow rate for removing excess heat to optimize cooling thereof in response to the local solar load when the ambient temperature exceeds the temperature of the at least a portion of the sealed roof or vertical wall.

* * * * *